US008224089B2

(12) United States Patent
Nielsen

(10) Patent No.: US 8,224,089 B2
(45) Date of Patent: Jul. 17, 2012

(54) INFORMATION PROCESSING DEVICE AND INFORMATION PROCESSING METHOD, IMAGE PROCESSING DEVICE AND IMAGE PROCESSING METHOD, AND COMPUTER PROGRAM

(75) Inventor: Frank Nielsen, Tokyo (JP)

(73) Assignee: Sony Corporation, Tokyo (JP)

( * ) Notice: Subject to any disclaimer, the term of this patent is extended or adjusted under 35 U.S.C. 154(b) by 842 days.

(21) Appl. No.: 11/913,264

(22) PCT Filed: Jun. 5, 2006

(86) PCT No.: PCT/JP2006/311251
§ 371 (c)(1),
(2), (4) Date: Jan. 28, 2009

(87) PCT Pub. No.: WO2006/132194
PCT Pub. Date: Dec. 14, 2006

(65) Prior Publication Data
US 2009/0175543 A1 Jul. 9, 2009

(30) Foreign Application Priority Data
Jun. 7, 2005 (JP) ................................ 2005-166466

(51) Int. Cl.
*G06K 9/34* (2006.01)
(52) U.S. Cl. ...................................................... 382/173
(58) Field of Classification Search .................. 382/173, 382/162–165, 282–283, 204, 128–131, 190, 382/199, 224–228
See application file for complete search history.

(56) References Cited

U.S. PATENT DOCUMENTS

| 5,774,124 | A | 6/1998 | Itoh et al. | |
|---|---|---|---|---|
| 6,606,408 | B1 * | 8/2003 | Kang et al. | 382/164 |
| 6,898,316 | B2 * | 5/2005 | Zhou | 382/190 |
| 7,623,709 | B2 * | 11/2009 | Gering | 382/173 |
| 7,986,831 | B2 * | 7/2011 | Nielsen | 382/164 |
| 8,073,217 | B2 * | 12/2011 | Sun et al. | 382/128 |

(Continued)

FOREIGN PATENT DOCUMENTS

JP         08-138082         5/1996

(Continued)

OTHER PUBLICATIONS

Frank Nielsen, Richard Nock, "On Region Merging: The Statistical Soundness of Fast Sorting With Applications". Proceedings of the 2003 IEEE Computer Society Conference on Computer Vision and Pattern Recognition, IEEE computer Society, 2003, vol. 2, pp. 19-26.

(Continued)

*Primary Examiner* — Ishrat I Sherali
(74) *Attorney, Agent, or Firm* — Finnegan, Henderson, Farabow, Garrett & Dunner, L.L.P.

(57) ABSTRACT

To perform progressive mesh segmentation suitable of interactive applications a high speed with high precision.
An image processing device 10 includes an image information input unit 1 for inputting three-dimensional image information to be processed in the format of an incidence graph, an incidence graph evaluation unit 2 for evaluating and sorting the edges of the input incidence graph, an image region mesh growing unit 3 for extracting pairs of image regions sandwiching edges in the sorted order and evaluating and performing mesh growing thereof based on a statistical processing algorithm, and a minute node processing unit 4 for processing minute regions remaining as a result of the image region mesh growing.

46 Claims, 15 Drawing Sheets

U.S. PATENT DOCUMENTS

2008/0056572 A1* 3/2008 Nielsen .................. 382/173

FOREIGN PATENT DOCUMENTS

| JP | 09-128561 | 5/1997 |
| JP | 11-096394 | 4/1999 |
| JP | 2001-43380 | 2/2001 |

OTHER PUBLICATIONS

Nock et al.; "Statistical Region Merging", IEEE Transactions on Pattern analysis and Machine Intelligence, vol. 26, No. 11, pp. 1452-1458, (2004).

Nock et al.; "Grouping with Bias Revisited", IEEE Computer Society Conference on Computer Vision and Pattern Recognition (CVPR'04), vol. 2, pp. 460-465, (2004).

Nielsen et al.; "On Region Merging: The Statistical Soundness of Fast Sorting, with Applications", IEEE Computer Society Conference on Computer Vision and Pattern Recognition (CVPR'03), vol. 2, pp. 19-26, (2003).

International Search Report from the Japanese Patent Office, International Application No. PCT/JP2006/311251, Jul. 4, 2006.

Sagi Katz et al., Hierarchical Mesh Decomposition using Fuzzy Clustering and Cuts, Department of Electrical Engineering, Technion-Israel Institute of Technology, 2003.

* cited by examiner

— BOUNDARY EDGE
— INTERNAL EDGE

INFORMATION PROCESSING DEVICE AND INFORMATION PROCESSING METHOD, IMAGE PROCESSING DEVICE AND IMAGE PROCESSING METHOD, AND COMPUTER PROGRAM

TECHNICAL FIELD

The present invention relates to an information processing device which handles massive amounts of data, and relates to an information processing device which causes raw data, made up of a great number of nodes which cannot be individually perceived, to be grown into perceivable increments of a smaller number, called segments.

Specifically, the present invention relates to an image processing device and image processing method, and computer program, for generating and displaying two-dimensional images of physical objects, and particularly relates to an image processing device and image processing method, and computer program, for handling objects as an assembly of a great number of nodes such as minute polygons or the like, so as to perform two-dimensional image processing of objects.

More specifically, the present invention relates to an image processing device and image processing method, and computer program, for performing processing mesh segmentation processing such as dividing image regions and merging divided regions, so that a polygonal mesh is adjusted to a suitable coarseness, and relates to an image processing device and image processing method, and computer program, for performing progressive mesh segmentation processing in accordance with an application using two-dimensional or three-dimensional computer graphics, for example.

BACKGROUND ART

Various media besides text-format files, such as audio, images, natural language, and so forth, can be digitized on a computer and handled mathematically, whereby higher-level and wide-ranging data processing can be performed, such as editing/processing, accumulating, managing, transmitting, sharing, and so forth, of information. For example, image processing technology wherein a computer is used to subject an image to digital image processing such as alteration of shape, alteration of color, image quality enhancement, re-encoding, and so forth, is in widespread use. This image processing technology includes special effects, wherein objects such as unsightly utility poles are removed from a scenic photograph, morphing wherein a human face is smoothly changed into an animal face, and so forth. Image processing technology is also applied to various specialized fields in science and medicine and so forth, such as processing photograph pictures transmitted from a satellite, processing of diagnosis images read in with a CT scanner, and so forth.

For example, image processing technology wherein an image of a two-dimensional or three-dimensional physical object is generated and displayed is called "computer graphics (CG)", and has received much attention. Generally, graphic systems of this type are configured of a geometric sub-system serving as the front end and a raster sub-system serving as the back end. Of these, the geometric sub-system handles an object as an assembly of a great number of minute polygons (normally triangles), with geometric calculations being performed regarding the vertices defining the polygons, such as coordinate transformation, clipping, light source calculation, and so forth.

Now, the coarseness of the mesh obtained by region division of the original object greatly affects the processing load and image quality. Region division of the original object into finer image regions proportionately increases the number of vertices to be processed, so the amount of processing increases. Also, larger-sized polygons result in the final product having a coarser image quality. Accordingly, processing such as merging the divided regions is performed to adjust the polygonal mesh into a suitable coarseness for the application using the CG, which is called mesh segmentation.

Mesh segmentation is a basic technique for growing raw data into a small number of perceivable increments called "segments". Research of mesh segmentation began from an early period in computer image processing in the 1970's (e.g., see Non-Patent Document 1), and the field is still active. From the start, mesh segmentation has handled color images, moving images, distance images (known as depth image or range image), three-dimensional data, three-dimensional mesh, and so forth. Hierarchical segmentation can be realized by creating multiple polygonal meshes having differing coarseness in the mesh segmentation processing. Also, performing hierarchical mesh segmentation in a progressive, that is, a smooth manner, enables the range of applications using the images to be increased.

For example, a proposal has been made regarding mesh segmentation processing wherein hierarchical mesh decomposition is performed using fuzzy image clustering and image cutting (e.g., see Non-Patent Document 2).

Mesh segmentation is basically processed based on the degree of similarity between neighboring image regions. For example, color signals of an input picture is converted into a predetermined color space, initial picture division is performed wherein the input picture is divided into multiple regions in accordance with the positions of color pixels in the input picture within the color space, the divided regions are separated into multiple layers in accordance with the horizontal neighboring relation between the divided regions and the vertical inclusive relation thereof, neighbor regions within each layer are grouped to form region groups, of which the vertical inclusive relations are extracted so as to structure regions, the order of joining of the regions is determined based on the horizontal relation between the regions and the vertical inclusive relation between the region groups, feasibility of joining is determined for neighbor regions based on the determined joining order, and in the event that determination is made that the evaluated regions are regions which have substantially the same picture properties, the regions can be joined (e.g., see Non-Patent Document 1).

However, conventional mesh segmentation processing primarily performs region growing, or hierarchical/iterative/spectral clustering. That is to say, algebraic operations using arrays are repeatedly performed, so processing speed is slow. For example, processing around 400 polygons takes 1 to 57 seconds, so progressively generating multiple mesh segmentations with differing coarseness is difficult. Also, the system has no scalability, and increase in the number of polygons markedly increases the processing time. Accordingly calculation with common calculators such as personal computers (PC) is difficult, and is inapplicable to interactive applications where the real-time aspect is required. There are also problems such as original information relating to the original image is lost, a great number of parameter values must be adjusted, and so forth.

Patent Document 1 Japanese Unexamined Patent Application Publication No. 2001-43380

Non-Patent Document 1 A. Rosenfeld, "Picture processing by computer" (Academic press, 1969)

Non-Patent Document 2 Sagi Katz and Ayellet Tal, Hierarchical mesh decomposition using fuzzy clustering and cots" (In Proc. SIGGRAPH (2003). ACM Trans. on Graphics 22, 3 (2003), 382-391)

DISCLOSURE OF INVENTION

Problems to be Solved by the Invention

It is an object of the present invention to provide a superb image processing device and image processing method, and computer program, capable of growing raw data, made up of a great number of nodes which cannot be individually perceived, into perceivable increments of a smaller number, called segments.

It is a further object of the present invention to provide a superb image processing device and image processing method, and computer program, capable of processing two-dimensional images of objects by handling physical objects as assemblies (i.e., segments) of a great number of minute nodes, and growing segments by mesh growing among the nodes.

It is a further object of the present invention to provide a superb image processing device and image processing method, and computer program, capable of performing processing mesh segmentation processing such as dividing image regions and merging divided regions to grow the regions, so that a polygonal mesh is adjusted to a suitable coarseness.

It is a further object of the present invention to provide a superb image processing device and image processing method, and computer program, capable of performing progressive mesh segmentation processing in accordance with an application using two-dimensional or three-dimensional computer graphics with high speed and high accuracy, for example.

The present invention has been made in light of the above problems, and accordingly a first aspect thereof is an information processing device for handling data in which a topology has been formed of a plurality of nodes each having attribute values, the information processing device comprising:

a topology evaluation unit for obtaining weighting factors of edges connecting nodes, based on attribute values which neighboring nodes on the topology each have, and sorting edges based on the weighting factors; and a node merging processing unit for extracting pairs of nodes connected by edges following the sorted order, evaluating whether or not to merge the nodes based on a predetermined statistical processing algorithm, and performing merging processing of node regions.

According to the first aspect of the present invention, whether or not to merge neighboring nodes is determined based on a predetermined statistical processing algorithm, and merging of nodes is repeatedly performed so as to be grown into perceivable increments of a smaller number, called segments from the raw data made up of a great number of nodes which cannot be individually perceived. With the statistical processing algorithm as referred to here, determination is made regarding whether or not neighboring nodes are similar, i.e., whether or not the nodes can be merged, based on a predicate derived from the phenomenon of concentration inequality in attribute information which each of the nodes has, for example.

Mesh growing of nodes based on such statistical processing is realized by the simple calculations of statistical processing of the attribute information which each node has, and accordingly high speed can be attained. For example, a common calculator such as a personal computer can be used to process one million polygons per second. Also, the system has scalability, since adjusting the parameter value included in the predicate allows the standard for merging nodes one with another to be freely set, so segments can be grown to a desired coarseness.

That is to say, according to the first aspect of the present invention, the topology of multiple nodes configuring raw data is taken as input values, and node merging processing is performed recursively following the statistical processing algorithm (i.e., mesh growing is performed), whereby segments of an arbitrary coarseness can be generated.

A second aspect of the present invention is an information processing device for performing image processing, handling an object as a polygonal mesh made up of a plurality of polygons, the information processing device comprising:

an incidence graph input unit for inputting an incidence graph describing a polygonal mesh;

an incidence graph evaluation unit for comparing attribute values which each of image regions connected by edges has and appropriating weighting factors to the edges based on the comparison results, and sorting edges in the incidence graph based on weighting values; and an image region mesh growing unit for extracting pairs of image regions sandwiching an edge in the sorted order, evaluating whether or not to merge the image regions based on a statistical processing algorithm, and performing mesh growing of the image regions.

The second aspect of the present invention relates to an image processing device for generating and displaying a two-dimensional image of a two-dimensional or three-dimensional object. In the field of computer graphics, normally, a two-dimensional or three-dimensional physical object to be processed is handled as an assembly of a great number of minute polygons (normally triangles), i.e., as a polygonal mesh, to perform image processing. The coarseness of the polygonal mesh greatly affects the processing load and image quality. Accordingly, mesh segmentation processing such as dividing image regions and merging divided regions, so that a polygonal mesh is adjusted to a suitable coarseness in accordance with the application using the 3DCG, is necessary. Also, performing hierarchical mesh segmentation in a progressive, that is, a smooth manner, enables the range of applications using the images to be increased.

However, with conventional techniques, processing speed is slow, so realizing progressive mesh segmentation with a common calculator is difficult, and further application cannot be made to interactive applications.

Compared with this, with the second aspect of the presents invention, determination is made regarding whether or not to merge neighboring image regions using a statistical processing algorithm, whereby merging of image regions is repeatedly performed from a great number of minute polygons into which a three-dimensional object has been divided, thereby generating a polygonal mesh having a desired coarseness. With the statistical processing algorithm, determination is made regarding whether or not to merge neighboring image regions, based on a predicate derived from the phenomenon of concentration inequality in area in a polygonal mesh serving as an image region. With the statistical processing algorithm as referred to here, determination is made regarding whether or not neighboring nodes are similar, i.e., whether or not the nodes can be merged, based on a predicate derived from the phenomenon of concentration inequality in area of the polygons configuring the image regions, for example.

Mesh growing of image regions based on such statistical processing is realized by the simple calculations of statistical processing of the area of polygons, and accordingly high speed can be attained. For example, a common calculator such as a personal computer can be used to process one million polygons per second. Also, the system has scalability, since adjusting the parameter value included in the predicate allows the standard for merging image regions to be freely set, so a polygonal mesh having a desired coarseness can be generated.

That is to say, according to the present invention, groups of a great number of minute polygons, into which the physical object to be processed has been divided, are taken as input values, and mesh growing processing of image regions made up of polygonal meshes is performed following the statistical processing algorithm (i.e., mesh growing is performed), whereby polygonal meshes of an arbitrary coarseness can be generated. Also, changing the parameter value of the predicate based on the statistical processing algorithm enables multiple polygonal meshes of differing coarsenesses to be smoothly generated. That is to say, this can be applied to various interactive applications which can realize progressive mesh segmentation.

Applications of the mesh segmentation processing according to the present invention includes parameterization and texture mapping, morphing, multi-resolution modeling, image editing, image compression, animation, shape matching, and so forth.

In the field of image processing, a polygonal mesh serving as an image region is commonly represented in the format of an incidence graph describing the relation of multiple polygons which are the components thereof. The mesh segmentation method according to the present embodiment uses an incidence graph described handling each of the polygons making up the polygonal mesh as nodes, using edges equivalent to sides of adjacent polygons in contact, so as to connect the corresponding nodes.

With the mesh segmentation method according to the second aspect of the present invention, first, the edges of the input incidence graph are evaluated and sorted. With edge evaluation, specifically, attributes which each of the image regions connected by edges have are compared and weighting factors are appropriated to the edges based on the comparison results. Image region as used here includes polygons which are the smallest increment, and an image region configured as a polygonal mesh wherein multiple polygons have been merged.

Attribute value as used here uses area which the image region has (the average area of all polygonal meshes merged into the image region) is used as an attribute value, and the difference in area between image regions connected by edges can be appropriated as the weight value of the edges. In this case, the smaller the difference in area between image regions is, the smaller the weight value is, and the higher the processing order is in the following image mesh growing. Alternatively, besides the area of the polygons making up the image region, edge weighting can be appropriated using the normal direction of image regions, or color and like pixel attribute information (average color of the image region regarding at least one component of RGB) (that is, in the case of polygonal mesh having texture).

With the mesh segmentation method according to the second aspect of the present invention, determination is made regarding whether or not to merge pairs of image regions connected by edges extracted in sorted order, based on the statistical processing algorithm derived from the statistical concentration inequality phenomenon in the area of polygons making up an image region; specifically, the two image regions $R_k$ and $R_l$ connected by edges are determined to be merged when satisfying the following predicate based on statistical algorithm. Note that in the following expression, the image region $R_k$ has area $S_k$ and is configured of $n_k$ polygons, and the image region $R_l$ has area $S_l$ and is configured of $n_l$ polygons, A is the largest area of the polygons, and Q is a parameter for controlling the coarseness of segmentation.

[Expression 1]

$$\left|\frac{S_k}{n_k} - \frac{S_l}{n_l}\right|^2 \leq \frac{A^2(n_k \log n_k + n_l \log n_l)}{Q}\left(\frac{1}{n_k} + \frac{1}{n_l}\right) \quad (1)$$

The predicate derived from the statistical processing algorithm above includes the parameter Q for controlling the coarseness of segmentation, so a parameter Q value such that a desired segmentation coarseness can be obtained can be externally provided. Also, an arrangement may be made such that upon a desired segmentation coarseness or number of divided image regions being provided externally, this is converted into a corresponding parameter Q value, which is then provided to the system. Such flexible parameter Q setting enables progressive mesh segmentation to be realized, making application to various interactive applications easier.

A node in the initial state is a polygon which is the smallest increment of the incidence graph, but as mesh growing of the image progresses, the nodes grow into an image region configured of a polygonal mesh made up of multiple polygons. The area and number of polygons regarding each node are calculated as information necessary for determining whether or not to merge nodes, i.e., image regions, by the predicate based on the statistical processing algorithm, and held as node statistical information. Also, in the event that image regions have been merged, the area and number of polygons are calculated for the image region newly generated by merging.

Now, after image region merging has progressed, the grown image regions have a great area and the number of polygons is great. In such a case, regardless of the fact that the information of polygons closer to the boundary is more important, the processing ends up being affected unnecessarily from the center portion of the image regions. That is to say, there is a problem that accurate boundary determination cannot be made with the above predicate based on the statistical processing algorithm.

Accordingly, an arrangement may be made wherein, when merging image regions, determination regarding subsequent merging of image regions is performed only with polygons around the region boundary left, which corresponds to the "Crust" of the newly-generated image region. In this case, the area and the number of polygons of the region which corresponds to the "Crust" is calculated instead of the entire image region newly generated by merging, and the node statistical information is updated (step S6).

For a "crust", an arrangement may be made wherein the polygons near the boundary over the entire circumference of the image region newly generated by merging, i.e., a "Circular Crust" alone is left for subsequent image region mesh growing. Updating processing of the node statistical information generated at the time of leaving the "Circular Crust" involves a relatively small amount of calculations, and also the subsequent determination regarding whether or not to merge image regions can be performed accurately.

Alternatively, for a "crust", an arrangement may be made wherein the polygons near the boundary where the image regions to be merged come into contact, i.e., a "Border Crust" alone is left for subsequent image region mesh growing. Using this Border Crust enables the subsequent determination regarding whether or not to merge image regions to be performed more accurately than with a case of using the Circular Crust. However, in the case of using the Border Crust, not only the node statistical information but also the incidence graph must be updated, and accordingly the amount of calculations is great.

Also, a third aspect of the present invention is a computer program described in a computer-readable format so as to execute, on a computer, processing for handling data in which a topology has been formed of a plurality of nodes each having attribute values, the program causing the computer to execute:

a topology evaluation step for obtaining weighting factors of edges connecting nodes, based on attribute values which neighboring nodes on the topology each have, and sorting edges based on the weighting factors; and a node merging processing step for extracting pairs of nodes connected by edges following the sorted order, evaluating whether or not to merge the nodes based on a predetermined statistical processing algorithm, and performing merging processing of node regions.

Also, a fourth aspect of the present invention is a computer program described in a computer-readable format so as to execute, on a computer, processing for handling an object as a polygonal mesh made up of a plurality of polygons, the program causing the computer to execute:

an incidence graph input step for inputting an incidence graph describing a polygonal mesh;

an incidence graph evaluation step for comparing attribute values which each of image regions connected by edges has and appropriating weighting factors to the edges based on the comparison results, and sorting edges in the incidence graph based on weighting values; and an image region mesh growing step for extracting pairs of image regions sandwiching an edge in the sorted order, evaluating whether or not to merge the image regions based on a statistical processing algorithm, and performing mesh growing of the image regions.

The computer programs according to the third and fourth aspects of the present invention define computer programs described in a computer-readable format so as to execute predetermined processing on a computer system. In other words, by installing the computer programs according to the third and fourth aspects of the present invention in a computer system, cooperative effects are manifested on the computer system, whereby advantages the same as those of the information processing device according to the first aspect and the image processing device according to the second aspect of the present invention can be obtained.

ADVANTAGES

According to the present invention, a superb image processing device and image processing method, and computer program, can be provided, capable of growing raw data, made up of a great number of nodes which cannot be individually perceived, into perceivable increments of a smaller number, called segments.

Also, according to the present invention, a superb image processing device and image processing method, and computer program, can be provided, which at the time of handling two-dimensional or three-dimensional physical object to be processed as an assembly of a great number of minute polygons (normally triangles), and processing the two-dimensional images can suitably perform mesh segmentation for adjusting the polygonal mesh to a suitable coarseness. That is to say, progressive mesh segmentation processing can be performed at high speed with high precision in accordance with applications using the computer graphics.

The image processing device according to the present invention can perform high-speed mesh growth of image regions based on a statistical processing algorithm, and is capable of realizing progressive mesh segmentation even with common calculators.

Also, with the mesh segmentation processing according to the present invention, adjusting the parameter value included in the predicate allows the standard for merging image regions to be freely set, so a polygonal mesh having a desired coarseness can be generated. Also, the system has scalability, and can be applied to various interactive applications such as parameterization and texture mapping, morphing, multi-resolution modeling, image editing, image compression, animation, shape matching, and so forth.

Other objects, features, and advantages of the present invention will become apparent from detailed description made by way of later-described embodiments and the attached drawings.

Figure 1:
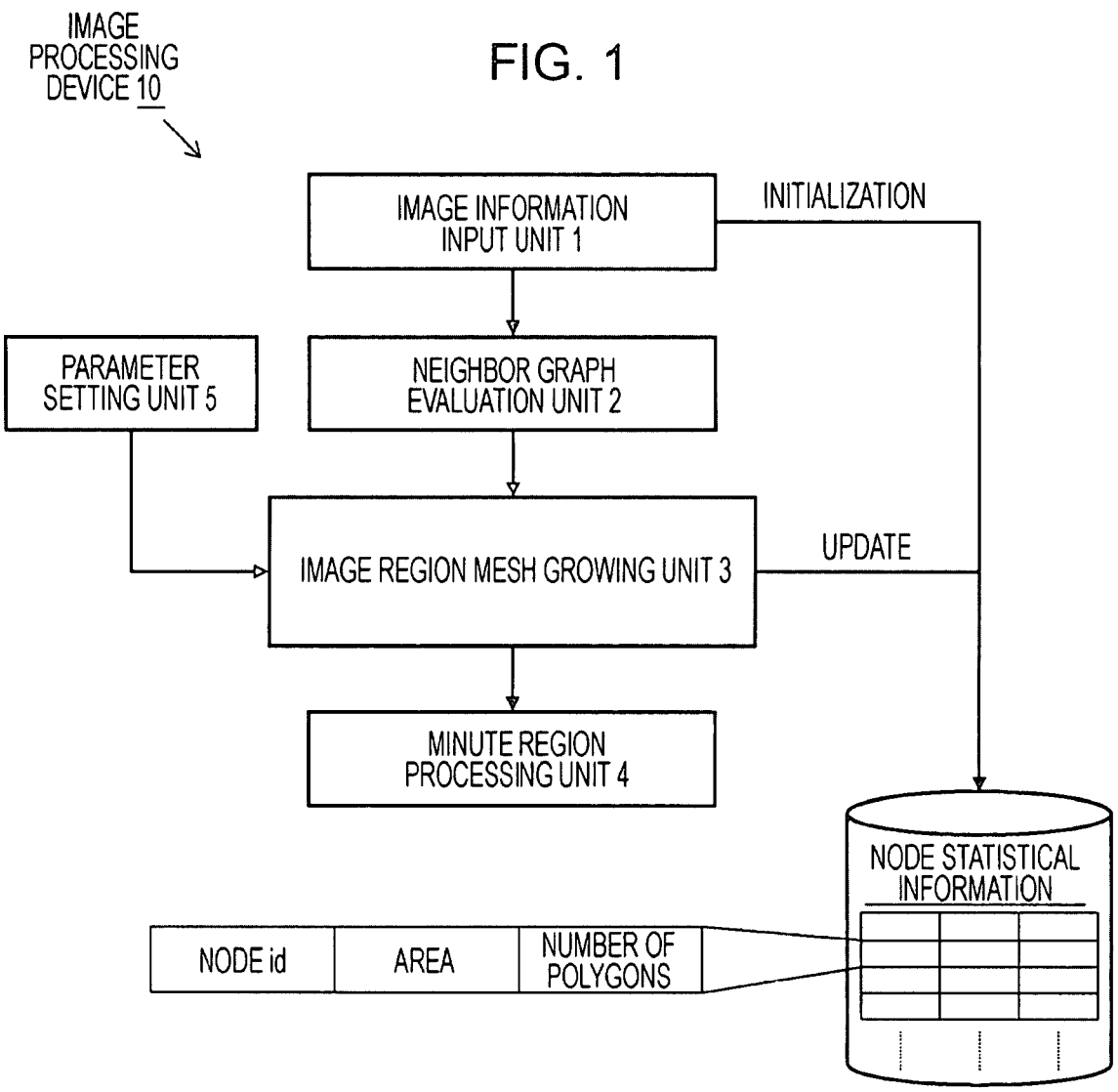
FIG. 1 is a diagram schematically illustrating the functional configuration of an image processing device according to an embodiment of the present invention.

| Reference Numerals | |
|---|---|
| 1 | image information input unit |
| 2 | incidence graph evaluation unit |
| 3 | image region mesh growing unit |
| 4 | minute region processing unit |
| 5 | parameter setting unit |
| 10 | image processing device |
| 50 | information processing device |
| 51 | node input unit |
| 52 | topology evaluation unit |
| 53 | mesh growing unit |
| 54 | minute node processing unit |
| 55 | parameter setting unit |

BEST MODE FOR CARRYING OUT THE INVENTION

Embodiments of the present invention will be described below with reference to the drawings.

The present invention relates to an information processing device which handles raw data wherein a topology has been formed by a great number of minute nodes which cannot be individually perceived, and is configured such that attribute information which each node holds is subjected to a predetermined statistical processing algorithm so as to determine whether or not to merge neighboring nodes based on the statistical processing algorithm, and merging of nodes is repeatedly performed so as to be grown into perceivable increments of a smaller number, called segments from the great number of nodes which cannot be individually perceived.

Figure 17:
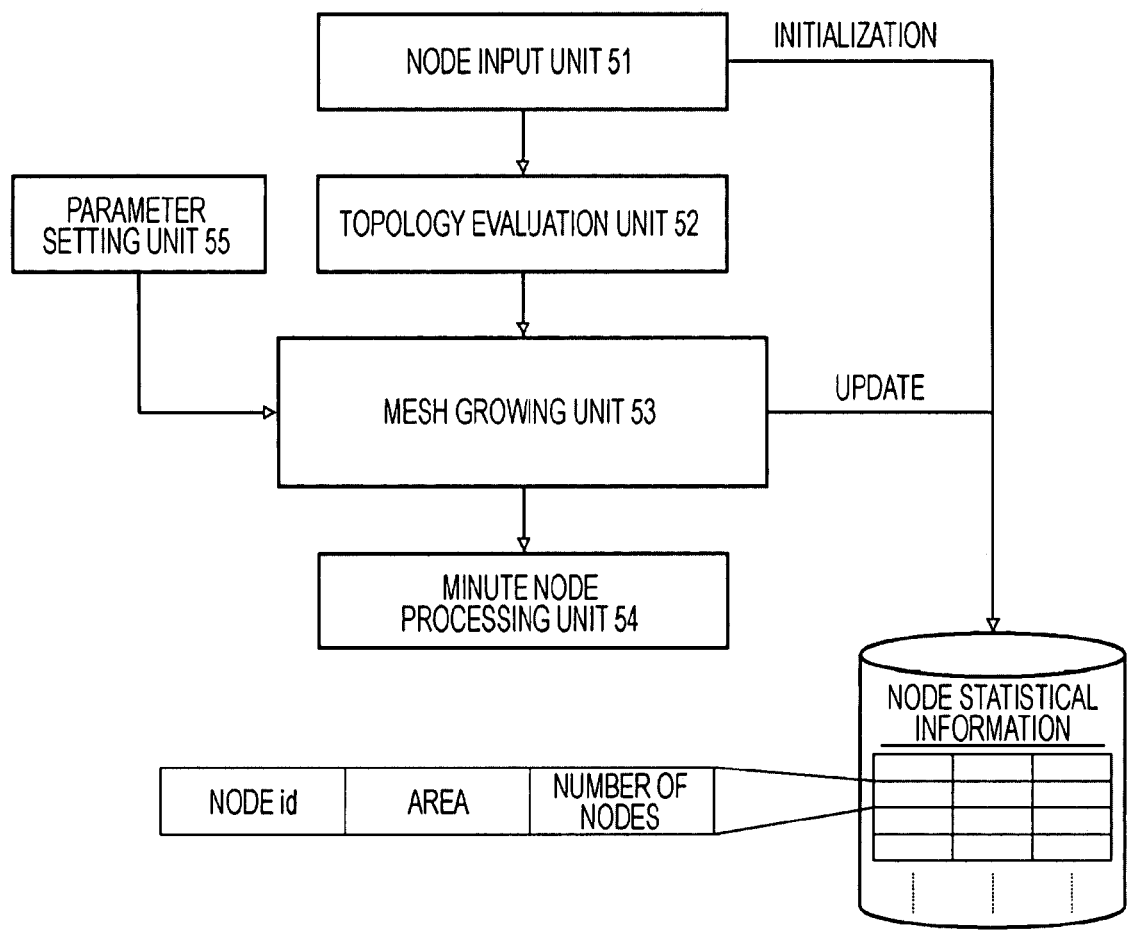
FIG. 17 is a diagram schematically illustrating the functional configuration of an image processing device according to an embodiment of the present invention.

FIG. 17 schematically illustrates the functional configuration of an information processing device according to an embodiment of the present invention. An information processing device 50 shown in the drawing includes a node input unit 51 for inputting raw data to be processed, wherein a topology is formed of multiple nodes, a topology evaluation unit 52 for evaluating and sorting the edges connecting neighboring nodes on the topology, a mesh growing unit 53 for extracting pairs of nodes connected by edges in the sorted order and evaluating and performing mesh growing thereof based on the statistical processing algorithm, and a minute node processing unit 54 for processing the remaining minute nodes which did not grow into segmentations of a sufficient size as a result of the node merging processing.

This type of image processing device can be designed as a dedicated hardware device, but can be realized in the form of activating application programs for executing processing equivalent to functional modules 51 through 54 on a common calculator system such as a personal computer (PC). A common calculator system uses a Pentium IV (1.6 GHz) manufactured by Intel Corporation of USA for a processor and has 1 GB of RAM, for example. Application programs can be coded in C++ language using the API (application programming interface) provided by the operating system (OS).

Data to be processed which is input to the node input unit 51 has a topology formed of multiple nodes. A topology is configured of multiple nodes and edges connecting nodes, with each node having attribute information. Attribute information relating to new nodes is also calculated when nodes are merged by the mesh growing unit 53.

The topology evaluation unit 52 evaluates and sorts edges connecting neighboring nodes included in the input data. Evaluation of the edges is performed more specifically by appropriating weighting factors to edges based on comparison results of comparing attribute values which the nodes connected by edges have, and sorting the edges in the topology based on the weight values. The weight values appropriated to the edges serve as indicators of degree of similarity among image regions connected by the edges.

In the event that a node has area, area is used as the attribute information thereof (the average value of the area of all original nodes merged into this node), the difference in area between nodes connected by an edge is appropriated as a weight value for the edge, and sorting is performed in increasing order of the weight value. In this case, the smaller the difference in area between nodes is, the smaller the weight value is, and the processing order in the subsequence mesh growing is higher. Alternatively, in the event that a node has color as attribute information, edge weight values can be evaluated using image attribute information (the average color of at least one component of R, G, and B).

Subsequently, the mesh growing unit extracts pairs of nodes sandwiching edges in the sorted order, and performs mesh growing, so as to grow the segmentation. Edges have appropriated thereto weighting serving as indicators of degree of similarity among image regions connected by the edges, so performing mesh growing in the increasing order of weight means that mesh growing is performed with higher priority among similar nodes.

The mesh growing unit 53 determines whether or not to merge pairs of nodes, based on the statistical processing algorithm. Specifically, determination is made that neighboring nodes f(i) and f(j) should be merged in the event that the nodes f(i) and f(j) satisfy a predicate based on the following statistical algorithm regarding statistical information Stats.f(i) and Stats.f(j) held respectively as attribute values. Note that in the following expression, node f(i) includes N(i) nodes and node f(j) includes N(j) nodes, function b(x) represents b(x)=(logx)/Q+(K/x), K is a constant, and Q is a parameter for controlling the coarseness of the segmentations grown by merging nodes.

[Expression 2]

$$|\text{Stats}.f(i) - \text{Stats}.f(j)|^2 \leq b(N[i]) + b(N[j]) \qquad (2)$$

The above predicate is derived from statistical concentration inequality, which is a phenomenon manifested in the area of polygons making up an image region. This phenomenon is commonly known as the central limit theorem. The central limit theorem stipulates the margin between a sample mean and true mean, and regardless of the distribution of the sample, the margin approximately follows a normal distribution if the number of samples is great.

The Q at the right-hand side of the above expression is a parameter for controlling the coarseness of segmentation. Increasing Q reduces the value of the right side, and as a result of satisfying the predicate being more difficult, node merging is suppressed. Reducing Q increases the value of the right side, and as a result of satisfying the predicate being easier, node merging, i.e., segmentation growth, is promoted.

Figure 18:
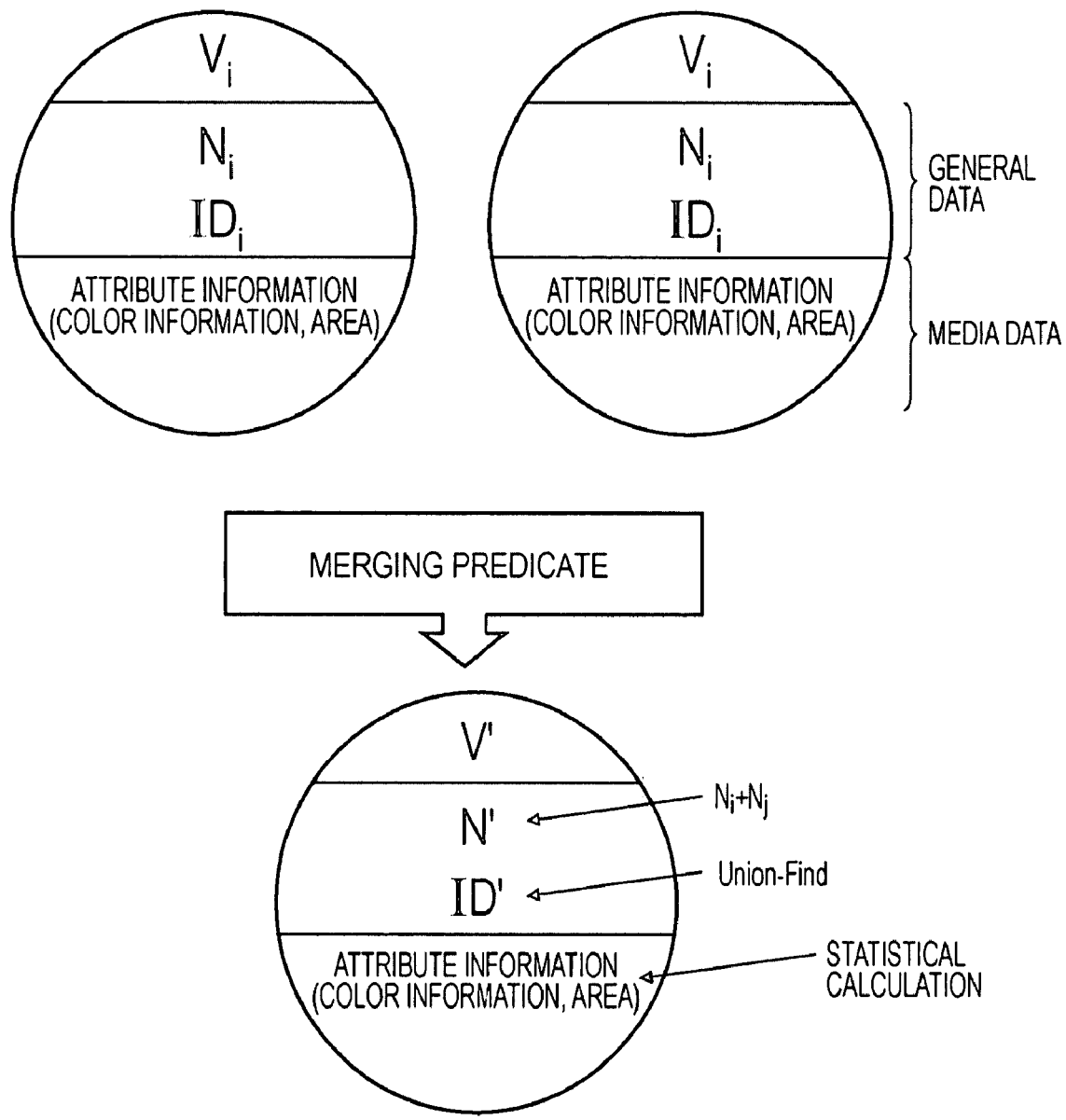
FIG. 18 is a diagram schematically illustrating merging of neighbor nodes to generate a new node.

FIG. 18 schematically illustrates the manner in which an i'th node Vi and j'th node Vj are subjected to mesh growing based on a merging predicate, so as to generate a new node V'.

Each node Vi and Vj is configured of a general information portion, such as the number of nodes Ni and Nj included in the node, and identification information IDi and IDj, and a media (data) portion for storing attribute information. In an initial state, a node only has itself and accordingly the number of nodes N is 1, but the number of nodes N' of the V' obtained by merging is Ni+Nj. Also, the new identification information ID' is generated from the original identification information IDi and IDj, using disjoint sets having Union-Find data structure. Also, attribute information in the media portion is obtained based on statistical computation from the attribute information of the nodes Vi and Vj. For example, in the event that the color information that the nodes have is the attribute information, the average color of the nodes Vi and Vj become the attribute information of the new node. Or, in the event that the area information that the nodes have is the attribute information, the average area of the nodes Vi and Vj become the attribute information of the new node. Also, regarding Union-Find algorithms, see "A class of algorithms which require nonlinear time to maintain disjoint sets" by R. E. Tarjan (J. Comput. Syst. Sci., 18(2): 110-127, 1979), for example.

Finally, the minute node processing unit 54 processes the remaining minute noise which did not grow into segmentations of a sufficient size as a result of the node merging processing. For example, minute noise remaining between or within nodes which have grown into large segmentations are merged into one of the neighboring segmentations regardless of whether or not the predicate is satisfied, thereby improving the appearance of the processing results.

Figure 19:
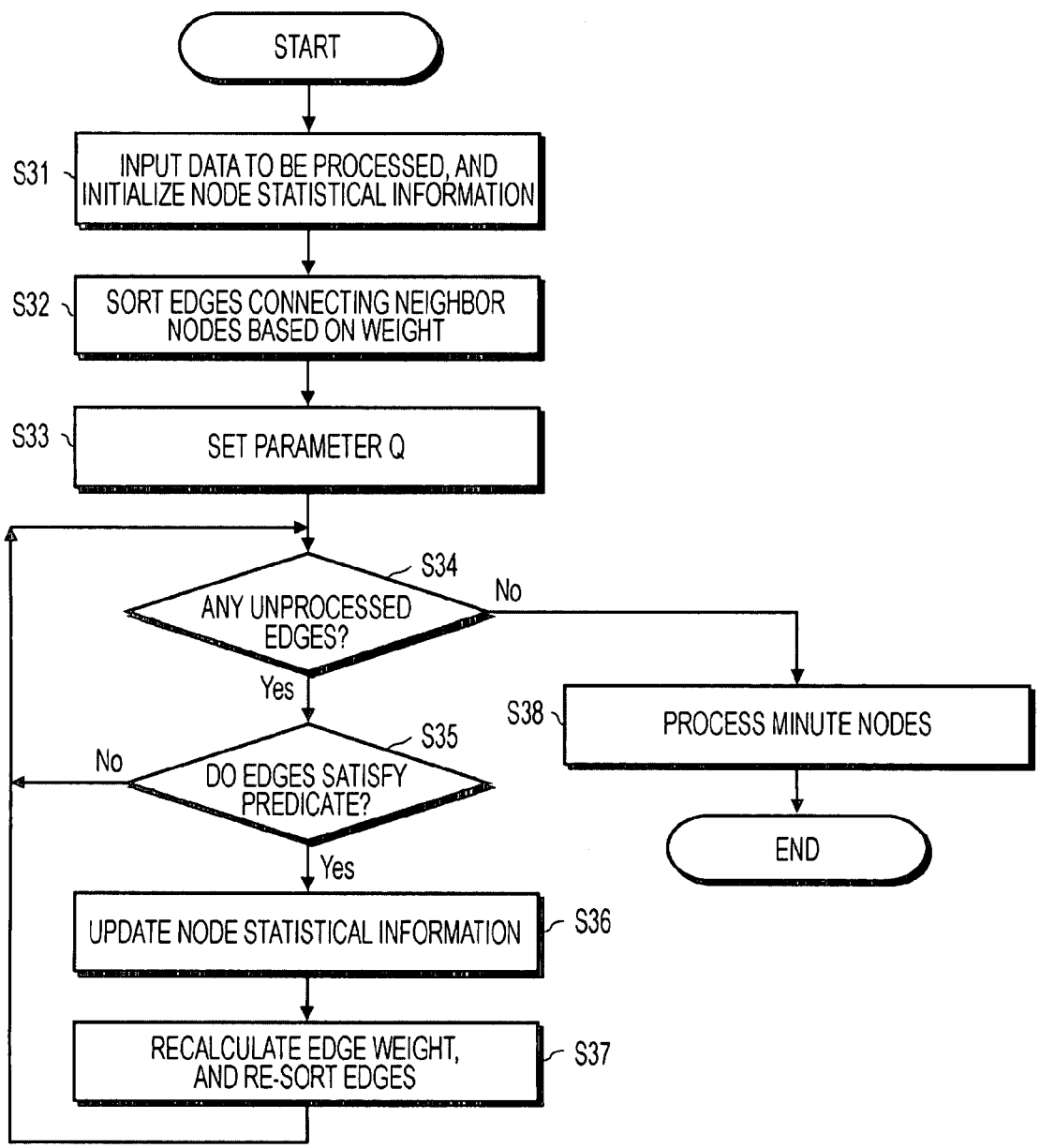
FIG. 19 is a flowchart illustrating procedures for performing segmentation processing with the information processing device shown in FIG. 17.

FIG. 19 illustrates the procedures of segmentation processing executed on the information processing device 20 shown in FIG. 17.

First, raw data to be processed is input at the node input unit 51 (Step S21). Raw data is made up of nodes forming a topology. The node input unit 51 performs initialization processing such as scanning the topology of the input data, appropriating an identification information IDi to each node Vi, and registering the identification information and attribute information stored in the media portion of the node as node statistical information.

Next, the topology evaluation unit 52 evaluates and sorts each of the edges connecting neighboring nodes (Step S32). Specifically, differences in attribute information between nodes connected by edges are appropriated as weight values, and sorting is performed in increasing order of weight value.

Next, the parameter Q for controlling the coarseness of segmentation is set by way of the parameter setting unit 55 (step S33).

The mesh growing unit 53 extracts pairs of nodes connected by edges, in the sorted order (Step S34). Mesh growing is then performed based on whether or not the nodes satisfy a predicate based on a statistical algorithm (step S35). The predicate used here is derived from statistical concentration inequality, which is a phenomenon manifested in the area of polygons making up an image region (discussed above), and uses the parameter Q set in step S33.

Upon merging nodes, the mesh growing unit 3 generates a new node V', appropriates a new ID' for identifying this node, calculates the attribute information newly generated by the merging, and performs updating processing of the node statistical information (step S36).

Next, the mesh growing unit 53 performs node updating processing (Step S37). That is to say, the weighting factors of the edges between the neighboring nodes are recalculated, and the edges are re-sorted based on the magnitude of the weight values. The flow then returns to step S34, pairs of nodes connected by edges are extracted in the sorted order, and node merging processing based on the statistical processing algorithm is repeatedly performed.

Such recursive repetition of node merging and node statistical information updating processing accompanying the merging eventually reaches a point where there can be found no node combinations satisfying the predicate wherein the threshold has been set with the parameter Q. That is to say, when there are no more unprocessed edges in the topology (No at step S34), the minute region processing unit 54 processes the remaining minute nodes which did not grow into segmentations of a sufficient size (step S38). For example, minute nodes remaining between or within large segmentations are merged into one of the neighboring segmentations regardless of whether or not the predicate is satisfied, thereby improving the appearance of the processing results.

The present invention can be applied to an image processing device for generating and displaying a two-dimensional image of a two-dimensional or three-dimensional object. In the field of computer graphics, normally, a two-dimensional or three-dimensional physical object to be processed is handled as an assembly of a great number of minute polygons (normally triangles), i.e., as a polygonal mesh, to perform image processing. The coarseness of the polygonal mesh greatly affects the processing load and image quality. Accordingly, mesh segmentation processing such as dividing image regions and merging divided regions, so that a polygonal mesh is adjusted to a suitable coarseness in accordance with the application using the computer graphics, is necessary. Also, performing hierarchical mesh segmentation in a progressive, that is, a smooth manner, enables the range of applications using the images to be increased.

With the mesh segmentation used with embodiments of the present invention, determination is made regarding whether or not to merge neighboring image regions using a statistical processing algorithm, whereby merging of image regions is repeatedly performed from a great number of minute polygons into which a three-dimensional object has been divided, thereby generating a polygonal mesh having a desired coarseness. With the statistical processing algorithm, determination is made regarding whether or not to merge neighboring image regions, based on a predicate derived from the phenomenon of concentration inequality in area in a polygonal mesh serving as an image region.

Mesh growing based on such statistical processing is realized by the simple calculations of statistical processing of the area of polygons, and accordingly high speed can be attained. For example, a common calculator such as a personal computer can be used to process one million polygons per second. Also, the system has scalability, since adjusting the parameter value included in the predicate allows the standard for merging image regions to be freely set, so a polygonal mesh having a desired coarseness can be generated.

FIG. 1 schematically illustrates the functional configuration of an image processing device according to an embodiment of the present invention. An image processing device 10 shown in the drawing includes a node input unit 1 for inputting three-dimensional image information to be processed in the format of an incidence graph, an incidence graph evaluation unit 2 for evaluating and sorting the edges of the input incidence graph, an image region mesh growing unit 3 for extracting pairs of image regions sandwiching edges in the sorted order and evaluating and performing mesh growing thereof based on the statistical processing algorithm, and a minute node processing unit 4 for processing the remaining minute nodes which did not grow into segmentations of a sufficient size as a result of the image region mesh growing.

This type of image processing device 10 can be designed as a dedicated hardware device, but can be realized in the form of activating application programs for executing processing equivalent to functional modules 51 through 54 on a common calculator system such as a personal computer (PC). A common calculator system uses a Pentium IV (1.6 GHz) manufactured by Intel Corporation of USA for a processor and has 1 GB of RAM, for example. Application programs can be coded in C++ language using the API (application programming interface) provided by OpenGL, for example.

In the field of image processing, a polygonal mesh serving as an image region is commonly represented in the format of an incidence graph (Incidence Graph or Region Adjacent Graph (RAG)) describing the relation of multiple polygons which are the components thereof. Several specific description methods of incidence graphs can be given. While an incidence graph is configured of multiple nodes and edges connecting the nodes, what to use for the nodes and edges varies widely. For example, in the case of taking polygons as nodes, the sides or vertices can serve as edges. Alternatively, in the case or taking sides of polygons as nodes, the vertices or the polygons can be taken as edges. Or, in the case of taking the vertices as nodes, the side of the polygons or the polygons can be taken as edges.

The image processing device 1 according to the present embodiment uses an incidence graph configured using polygons as nodes and the sides of the polygons as edges. That is to say, the image processing device 1 takes as input data an incidence graph described using edges equivalent to sides of adjacent polygons in contact, so as to connect the corresponding nodes.

Now, a method for creating an incidence graph will be described.

First, polygons $T_i$ belonging to an image region to be handed are correlated with nodes $N_i$. In the event that there is a single side between the nodes $N_i$ and nodes $N_j$ belonging to polygons $T_i$ and $T_j$ corresponding to both, edges connecting the nodes are generated as edges $e_{ij}$.

An incidence graph can be directly constructed from an index array of vertices and planes, by sorting polygons according to the ends of edges. The sides, i.e., edges belonging to each of the polygons are divided into edges serving as boundaries of the polygonal mesh, that is to say the image region (boundary edge), and edges in contact with other neighboring polygons within the polygonal mesh, rather than with the polygonal mesh (interior edge). An edge serving as a boundary of the image region only belongs to one polygon, so only non-boundary edges (i.e., within the image region) are to be processed. This processing can be performed as long as there is an index array of vertices and planes, and there is no need for complex data structures such as half-edge, quad-edge, and so forth.

Figure 2:
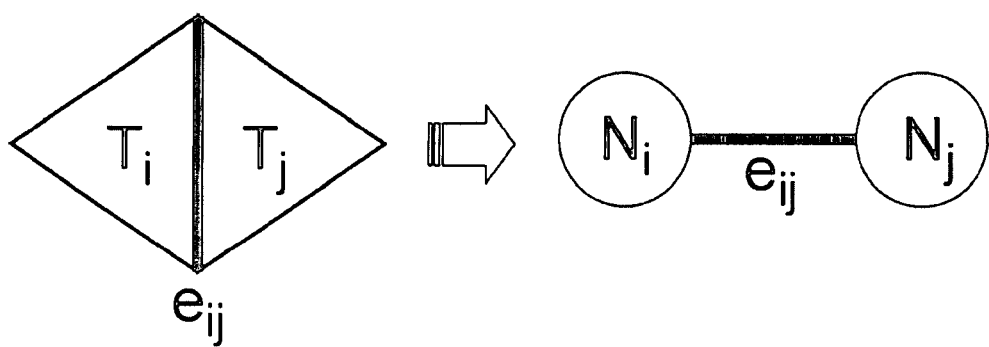
FIG. 2 is a diagram exemplarily illustrating an incidence graph.

FIG. 2 illustrates an example of the simplest incidence graph. The polygonal mesh shown to the left in the drawing is configured of two triangles $T_i$ and $T_j$, in contact with a side, i.e., the edge $e_{ij}$. The incidence graph describing this polygonal mesh is configured of the two nodes $N_i$ and $N_j$ equivalent to the triangles $T_1$ and $T_1$, and the edge $e_{ij}$ connecting the nodes, as shown to the right in the drawing.

Figure 3:
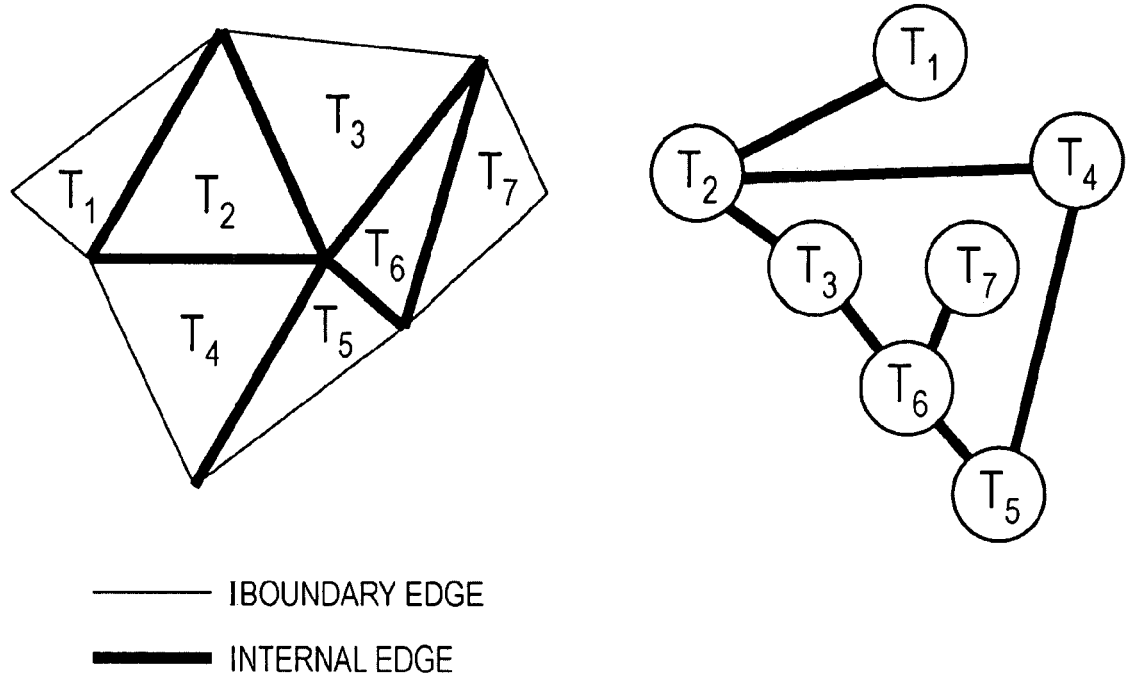
FIG. 3 is a diagram exemplarily illustrating an incidence graph.

Also, FIG. 3 shows a configuration of a somewhat complicated incidence graph. The polygonal mesh shown to the left in the drawing is configured of seven triangles $T_1$ through $T_7$, wherein $T_1$ is in contact with $T_2$; $T_2$ is in contact with $T_1$, $T_3$, and $T_4$; $T_3$ is in contact with $T_2$ and $T_6$; $T_4$ is in contact with $T_2$ and $T_5$; $T_5$ is in contact with $T_4$ and $T_6$; and $T_6$ is in contact with $T_3$, $T_5$, and $T_7$. The incidence graph describing this polygonal mesh is configured connecting nodes corresponding to the triangles with the sides, that is to say edges, belonging to both of the neighboring triangles, as shown to the right in the drawing.

Note that a node is a polygon which is the smallest increment of the polygonal mesh in the initial state. Alternatively, individual pixels in a two-dimensional image, or a voxel in a three-dimensional image is a single node. As mesh growing of the image progresses, the nodes grow into an image region configured of a polygonal mesh made up of multiple polygons (or pixels or voxels). The image processing device 1 holds therein, with regard to each node $N_i$, identification information $id(N_i)$ for uniquely identifying, the area $area(N_i)$ which the image area (a single polygon at first) has, and the number $n(N_i)$ of polygons making up the image region, that is to say, the polygonal mesh (initial value is 1), as "node statistical information". The reason that each node holds the area and the number of polygons is that this is information necessary for determination processing regarding whether or not to merge nodes, i.e., image regions, made by the predicate based on the statistical processing algorithm.

The incidence graph evaluation unit 2 evaluates and sorts the edges of the input incidence graph. With edge evaluation, specifically, attributes which each of the image regions connected by edges have are compared and weighting factors are appropriated to the edges based on the comparison results, and the edges in the incidence graph are sorted based on the weight values. Image region as used here includes polygons which are the smallest increment, and an image region configured as a polygonal mesh wherein multiple polygons have been merged.

For example, area which the image region has (the average value of the area of all polygons merged into the image region) is used as an attribute value, the difference in area between image regions connected by edges is appropriated as the weight value of the edges, and sorted in increasing order of the weight values. In this case, the smaller the difference in area between image regions is, the smaller the weight value is, and the higher the processing order is in the following image mesh growing.

Figure 4:
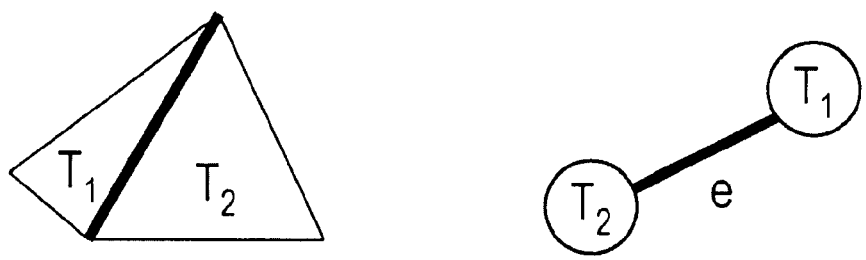
FIG. 4 is a diagram for describing a processing method for edge evaluation.

FIG. 4 illustrates a processing method for performing edge evaluation. Here, we will assume two triangles $T_i$ and $T_j$ which contact on an edge $e_{ij}$, with the incidence graph configured of two nodes $N_i$ and $N_j$ equivalent to the triangles $T_i$ and $T_j$, and the edge $e_{ij}$ connecting the nodes, as shown to the right in the drawing. If we say that the function area(P) for obtaining the area of a polygon P as been defined, the weight $W(e_{ij})$ of the edge $e_{ij}$ is calculated by the following expression.

[Expression 3]

$$W(e) = |area(T_1) - area(T_2)| \qquad (3)$$

Alternatively, besides the area of the polygons making up the image region, edge weighting can be appropriated using the difference in various attributes of neighboring vertices, such as normal direction of image regions, color and like pixel attribute information (average color of at least one component of RGB) (that is, in the case of polygonal mesh having texture), and so forth.

For example, in an RGB color image having a width of w and a height of h, the node of a pixel at the i'th row and j'th column is taken as $V_{i,j}$, and the identification information as $RegID(V_{i,j}) = i \times w + j$. Internal pixels each have four neighbor nodes, with the total m of edges being $2wh - w - h$. A weighting factor between nodes $V_{i,j}$ and $V_{i',j'}$ can be expressed with the following expression, for example.

[Expression 4]

$$w(E=(V_{i,j},V_{i'j'}))=\max_{c\in\{R,G,B\}}(|I_c(i,j)-I_c(i',j')|) \qquad (4)$$

The image region mesh growing unit 3 extracts pairs of image regions sandwiching edges, in the sorted order, and performs mesh growing. Edges are appropriated weighting serving as an indicator of degree of similarity between the image regions connected by the edges, so performing mesh growing in increasing order means that mesh growing is executed with higher priority between similar image regions.

The image region mesh growing unit 3 determines whether or not to merge pairs of image regions connected by edges extracted in sorted order, based on the statistical processing algorithm.

Specifically, in the event that the edge weight is calculated based on the area information as with the Expression (3) above, the two image regions $R_k$ and $R_l$ connected by edges are determined to be merged when satisfying the following predicate based on statistical algorithm. Note that in the following expression, the image region $R_k$ has area $S_k$ and is configured of $n_k$ polygons, and the image region $R_l$ has area $S_l$ and is configured of $n_l$ polygons. Also, A is the largest area of the polygons, and Q is a parameter for controlling the coarseness of segmentation.

[Expression 5]

$$\left|\frac{S_k}{n_k}-\frac{S_l}{n_l}\right|^2 \le \frac{A^2(n_k\log n_k + n_l\log n_l)}{Q}\left(\frac{1}{n_k}+\frac{1}{n_l}\right) \qquad (5)$$

The above predicate is derived from the phenomenon of statistical concentration inequality in area in a polygonal mesh serving as an image region. This phenomenon is common as the central limit theorem in the field of statistics (even if a parent population is of an arbitrary distribution, increasing the size of samples will cause the distribution of the sample mean to eventually converge on the normal distribution).

The Q at the right-hand side of the above expression is a parameter for controlling the coarseness of segmentation. Increasing Q reduces the value of the right side, and as a result of satisfying the predicate being more difficult, image region merging is suppressed. Reducing Q increases the value of the right side, and as a result of satisfying the predicate being made easier, image region merging is promoted, so coarser mesh segmentation results can be obtained.

Alternatively, in the event that the edge weight is calculated based on RGB color information as with the Expression (4) above, the image nodes are determined to be merged regarding the neighboring nodes $V_{i,j}$ and $V_{i',j'}$ connected by edges when satisfying the following predicate based on statistical algorithm.

[Expression 6]

$$\max_{c\in\{R,G,B\}}(\bar{I}_c(i,j)-\bar{I}_c(i',j'))\le b(n_{i,j})+b(n_{i',j'}) \qquad (6)$$

Note that the function b(x) in the above expression is as shown below.

[Expression 7]

$$b(x) = \frac{256^2}{2Qx}(\min(256, x)\log x + 2\log 6wh) \qquad (7)$$

In the above expression, $n_{i,j}$ and $n_{i',j'}$ represent the number of pixels included in the relevant nodes. Also, Q is a parameter for controlling the segmentation coarseness.

In its initial state, a node is a polygon which is the smallest increment of the polygonal mesh, but as mesh growing of the image region proceeds, grows into an image region configured of a polygonal mesh configured of multiple polygons. The node statistical information is provided with a record holding, with regard to each node $N_i$, identification information id($N_i$) for uniquely identifying, the area area($N_i$) which the image area (a single polygon at first) has, and the number n($N_i$) of polygons making up the image region, that is to say, the polygonal mesh (initial value is 1). Upon nodes being merged, the image region mesh growing unit 3 provides a new id for identifying the new node, calculates the area of the image region newly generated by merging and calculates the number of polygons, and updates the node statistical information. The Union-Find algorithm can be used for generating the new identification information.

The minute region processing unit 4 processes the minute regions remaining as a result of the image region mesh growing. For example, minute polygonal meshes remaining between or within large image regions are merged into one of the neighboring image regions, regardless of whether or not the predicate is satisfied, thereby improving the appearance of the processing results. The term minute region as used here is a polygonal mesh having an area of less than a few percent of the entire mesh surface, for example.

Figure 5:
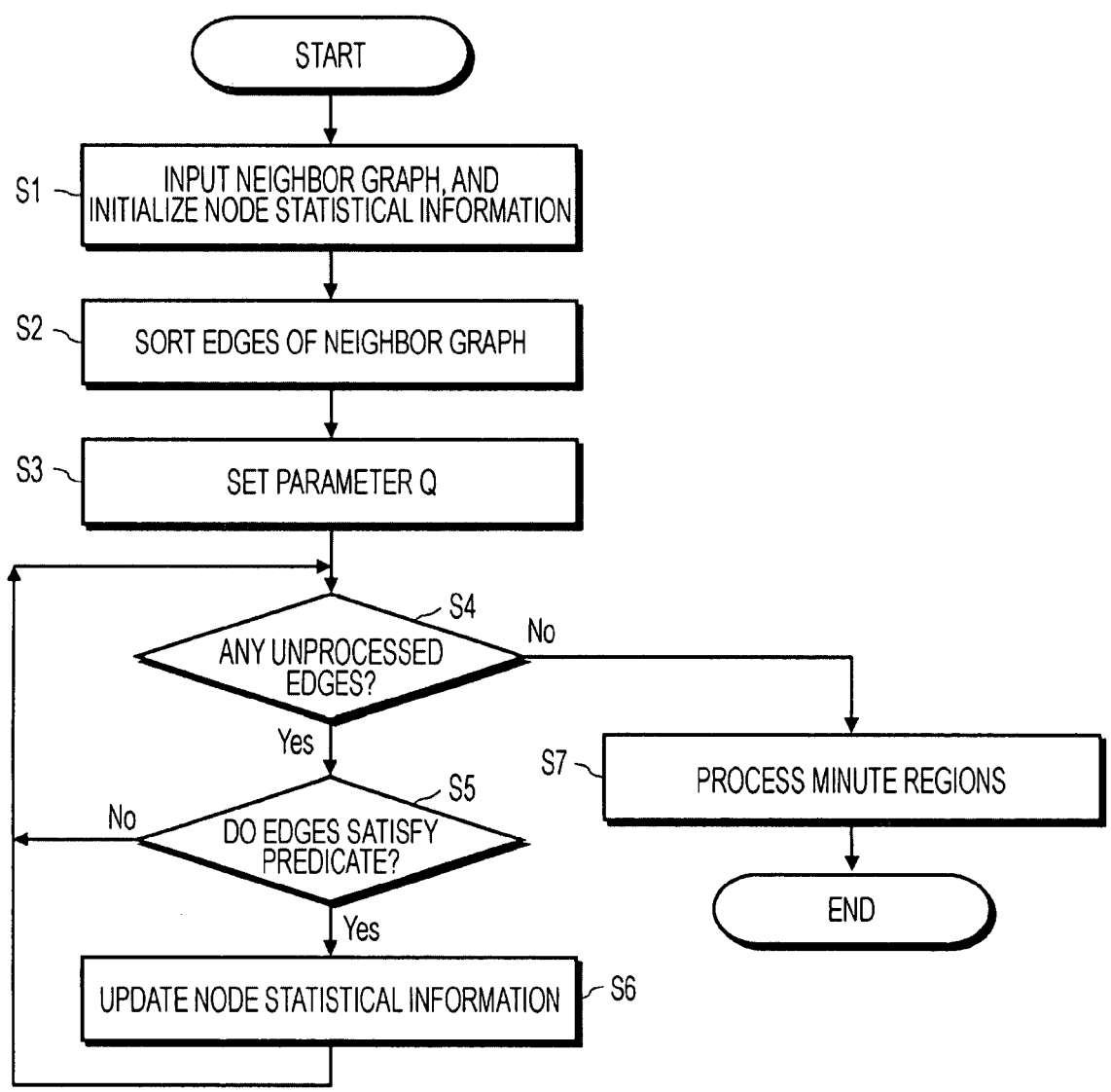
FIG. 5 is a flowchart illustrating an example of processing procedures for mesh segmentation processing.

FIG. 5 illustrates an example of the procedures of segmentation processing executed on the information processing device 10 according to the present embodiment, in a flowchart format.

First, image information of the three-dimensional object to be processed is input at the image information input unit 1 (Step S1). With the present embodiment, image information is described in an incidence graph configured with polygons as nodes and the sides of the polygons as edges (see above description and FIG. 3).

The image information input unit 1 scans the input incidence graph, appropriates identification information id($N_i$) to each node $N_i$, obtains the area of corresponding polygons, and registers the identification information, area, and number of polygons (initial value is 1) for each node in the node statistical information (initialization). A mock program code of initializing node statistical information is shown below. Note here that id( ) is an array which stores node identification information indicated by an argument, area( ) is an array which stores the area of the node of the identification information indicated by an argument, and no is an array which stores the number of polygons configuring the node of the identification information indicated by an argument.

[Expression 8]

$$id(N_i)=i$$

$$area(i)=area(T_i)$$

$$n(i)=1 \qquad (8)$$

With respect to the node $N_i$ extracted the i'th from the incidence graph, i is substituted into the identification information id($N_i$), the area area($T_i$) of the corresponding polygon is substituted into the area(i) of the node $N_i$, and the initial value 1 is substituted into the number n(i) of polygons.

Next, at the incidence graph evaluation unit 2, the edges of the input incidence graph are evaluated and sorted (step S2). Specifically, the difference in area between image regions connected by edges are appropriated as edge weight values, and sorting is performed in the increasing order of weight values. The smaller the difference between image regions is, the smaller the weight value is, and the higher the processing order in the subsequent image merging processing is.

Next, the parameter Q for controlling the coarseness of segmentation is set from the parameter setting unit 5 (step S3).

The image region mesh growing unit 3 extracts pairs of image regions sandwiching edges, in the sorted order (step S4). Mesh growing is then performed based on whether or not these image regions satisfy a predicate based on a statistical algorithm (step S5). The predicate used here is derived from the statistical concentration inequality which is a phenomenon occurring in area of polygons serving as an image region (described above), using the parameter Q set in step S3.

The node statistical information is provided with a record holding, with regard to each node $N_i$, identification information $id(N_i)$ for uniquely identifying, the area area$(N_i)$ which the image area (a single polygon at first) has, and the number $n(N_i)$ of polygons making up the image region, that is to say, the polygonal mesh (initial value is 1) (described above). Upon image regions being merged, the image region mesh growing unit 3 generates a new node, provides a new id for identifying the new node, calculates the area and the number of polygons of the image region newly generated by merging, and updates the node statistical information (step S6).

A mock program code of merging image regions and subsequently updating the node statistical information is shown below. Note here that Merge( ) is a function for performing mesh growing of the image regions indicated by arguments.

[Expression 9]

$$\text{Merge}(N_i, N_j)$$

$$id'(N_i) = id'(N_j)$$

$$\text{area}(id'(N_i)) = \text{area}(id(N_i)) + \text{area}(id(N_j))$$

$$n(id'(N_i)) = n(id(N_i)) + n(id(N_j))$$

$$id(N_i) \leftarrow id'(N_i)$$

$$id(N_j) \leftarrow id'(N_j) \quad (9)$$

First, mesh growing of the nodes $N_i$ and $N_j$ indicated by the arguments of the Merge function is performed. The nodes $N_i$ and $N_j$ are provided with the same new identification information $id'(N_i) = id'(N_j)$, indicating that the image regions have been merged and a new node has been generated. With the present embodiment, the old identification information of one or the other of $N_i$ and $N_j$ is used as the new node identification information. The Union-Find algorithm (described earlier), devised by Robert Endre Tarjan can be used for providing new nodes with identification information.

Next, the sum of the area of the original image regions area$(N_i)$+area$(N_j)$ is substituted into the area area$(id'(N_i))$, and also the sum of the number of polygons of the original image regions $n(id(N_i))+n(id(N_j))$ is substituted into the number of polygons of the new node $n(id'(N_i))$. The new identification information $id'(N_i)$ and $id'(N_j)$ is provided to the nodes $N_i$ and $N_j$ respectively, thereby ending updating of the node statistical information.

Upon ending processing for all edges within the incidence graph (step S4), the minute region processing unit 4 processes minute regions remaining as the result of mesh growing of image regions (step S7). For example, minute polygonal meshes remaining between or within large image regions are merged into one of the neighboring image regions, regardless of whether or not the predicate is satisfied, thereby improving the appearance of the processing results. The term minute region as used here is a polygonal mesh having area of less than a few percent of the entire mesh surface, for example.

Mesh growing based on such statistical processing is realized by the simple calculations of statistical processing of the area of polygons, and accordingly high speed can be attained. For example, a common calculator system (described above) can be used to process around one million polygons per second. Also, the system has scalability, since adjusting the parameter value Q included in the predicate allows the standard for merging image regions to be freely set, so a polygonal mesh having a desired coarseness can be generated.

Figure 6:
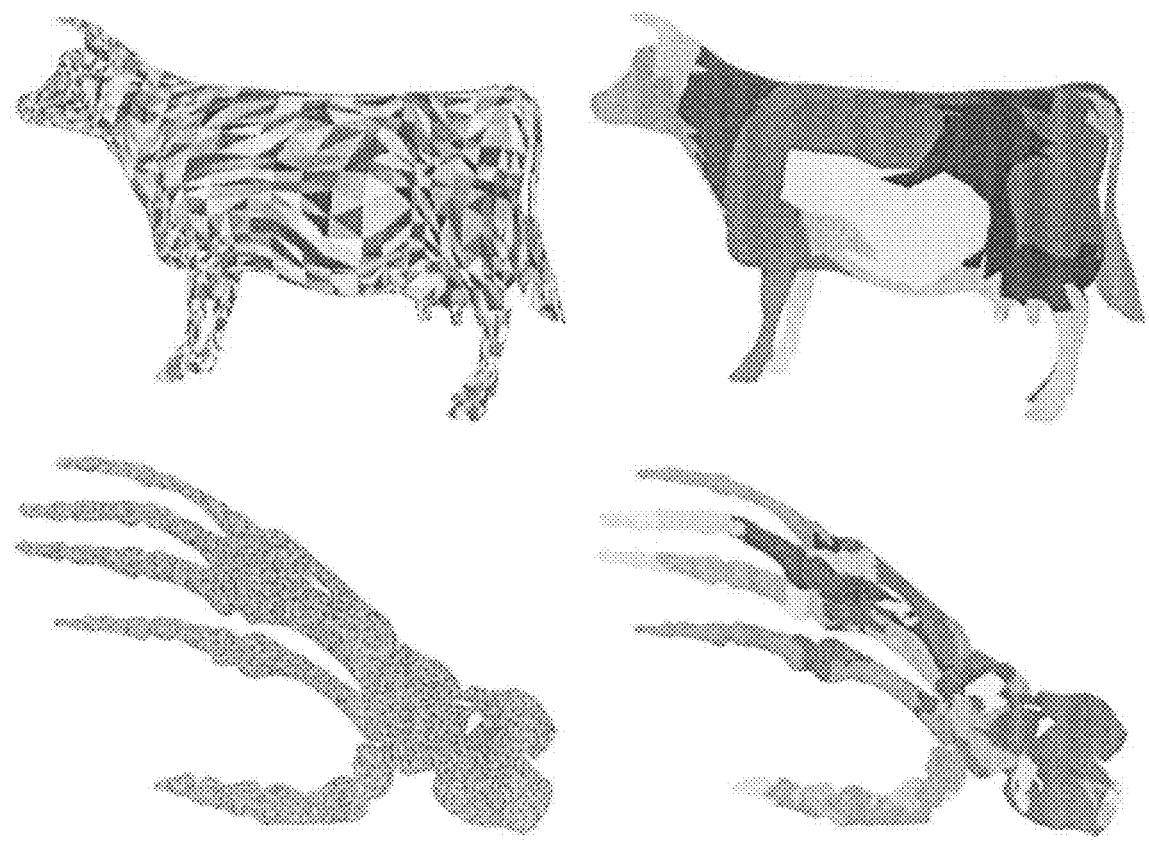
FIG. 6 is a diagram illustrating an example of segmentation results interactively obtained in a case wherein a user has used a slide bar to set a multi-scale parameter Q.

The user can interactively set the value of Q via the parameter setting unit 5, for example. For example, a slide bar can be provided on the display screen, such that Q can be input with this bar. FIG. 6 illustrates examples of segmentation results obtained interactively by the user setting the multi-scale parameter Q using a slide bar. Inputting a different Q requires the image region mesh growing unit 3 and the minute region processing unit 4 to repeat their processing, but the processing thereof has general linearity. Increasing Q reduces the value of the right side, and as a result of satisfying the predicate being more difficult, image region merging is suppressed. Reducing Q increases the value of the right side, and as a result of satisfying the predicate being made easier, image region merging is promoted, so coarser mesh segmentation results can be obtained.

It should be noted that almost all meshes are either scanned or generally re-meshed, so highly precise segmentation can be performed simply by processing the area of polygons following the statistical algorithm. That is to say, a mesh implicitly encodes surface properties such as normal line and curvature in the area of polygons. An arrangement may be made wherein, at the pre-processing stage, re-meshing is performed such that an arbitrary mesh matches such conditions.

Figure 7:
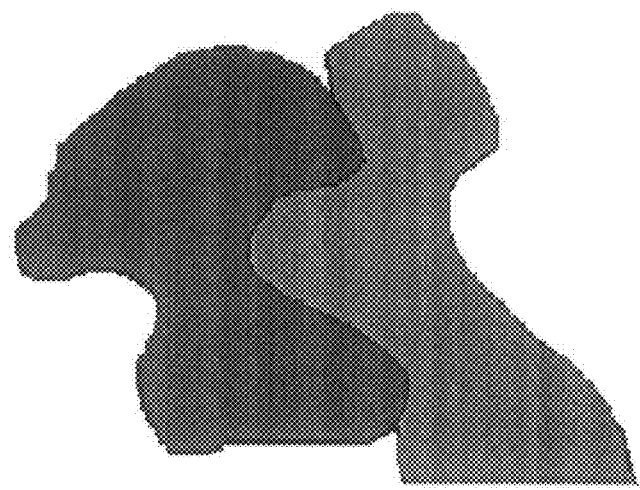
FIG. 7 is a diagram illustrating a progressed state of image region mesh growing.

Now, after image region merging has progressed (see FIG. 7), the grown image regions have a great area and the number of polygons is great. In such a case, regardless of the fact that the information of polygons closer to the boundary is more important, the processing ends up being affected unnecessarily from the center portion of the image regions. That is to say, there is a problem that accurate boundary determination cannot be made with the above predicate based on the statistical processing algorithm.

Accordingly, an arrangement may be made wherein, when merging image regions, determination regarding subsequent merging of image regions is performed only with polygons around the region boundary left, which corresponds to the "Crust" of the newly-generated image region. In this case, the area and the number of polygons of the region which corresponds to the "Crust" is calculated instead of the entire image region newly generated by merging, and the node statistical information is updated (step S6).

Figure 8:
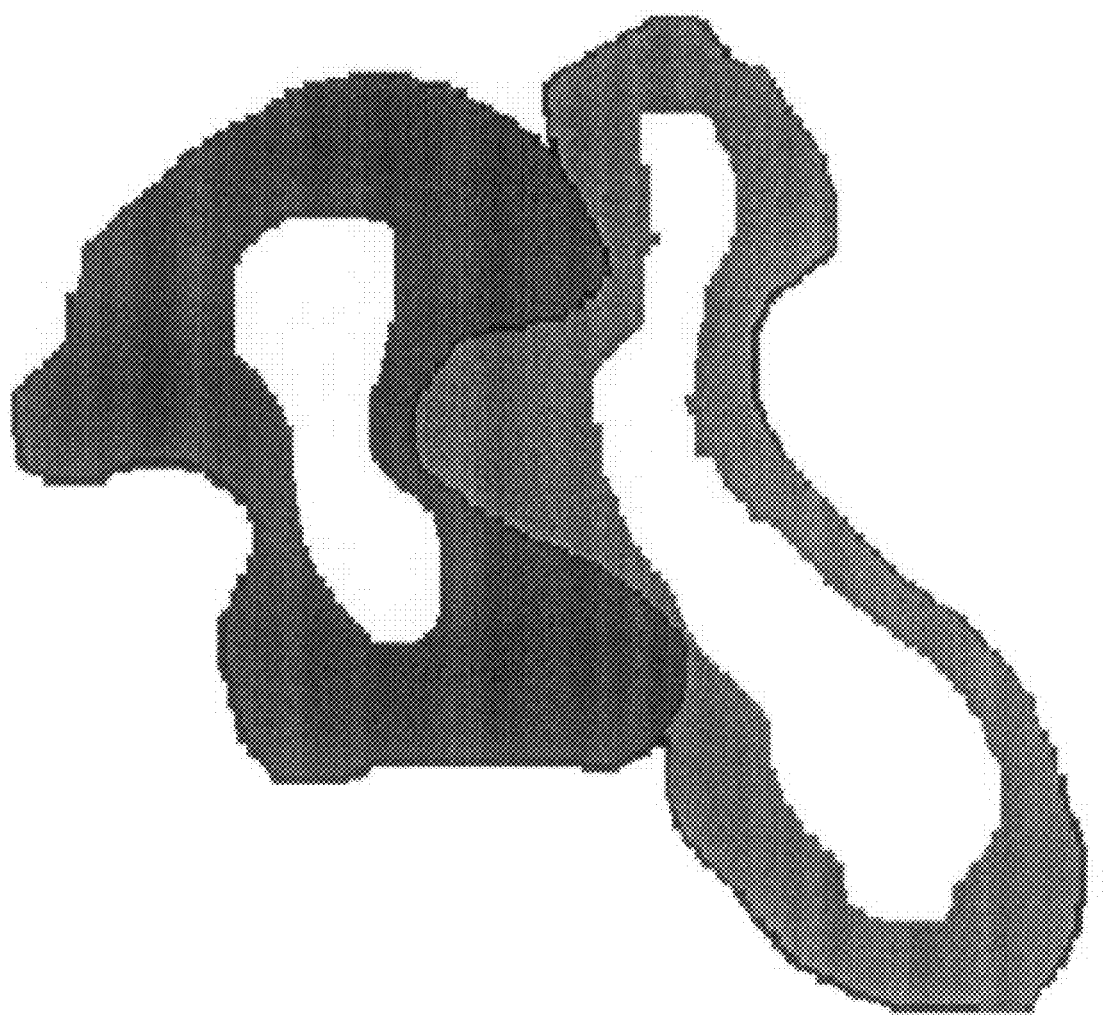
FIG. 8 is a diagram illustrating a state wherein only polygons near a border circumscribing the entirety of an image region newly generated by merging, i.e., a "Circular Crust", is left.

For a "crust", an arrangement may be made wherein the polygons near the boundary over the entire circumference of the image region newly generated by merging, as shown in FIG. 8 for example, i.e., a "Circular Crust" alone is left for subsequent image region mesh growing. Updating processing of the node statistical information generated at the time of leaving the "Circular Crust" involves a relatively small amount of calculations, and also the subsequent determination regarding whether or not to merge image regions can be performed accurately.

Figure 9:
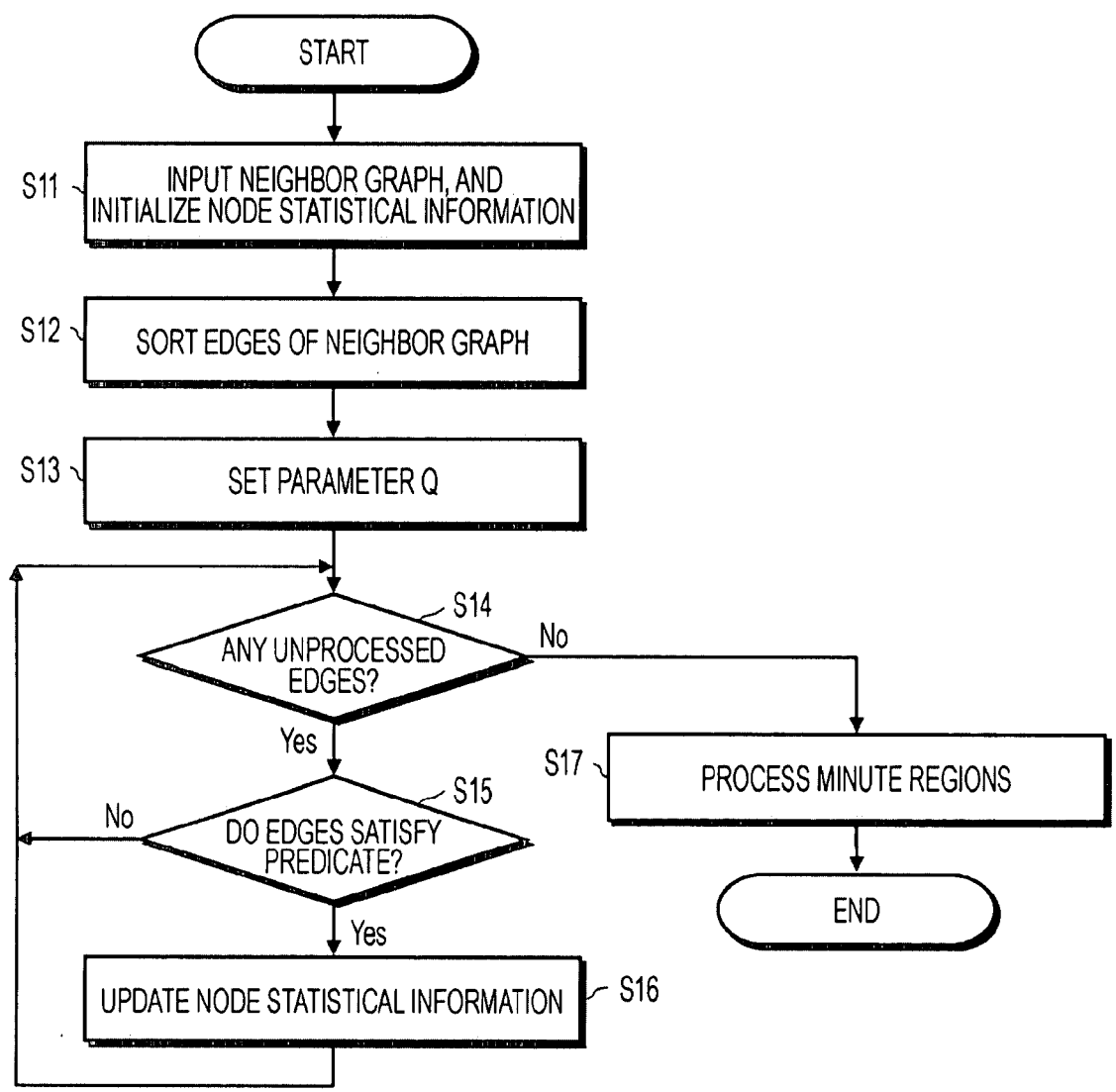
FIG. 9 is a flowchart illustrating processing procedures for performing mesh segmentation processing to leave only a "Circular Crust".

FIG. 9 illustrates the processing procedures for performing mesh segmentation leaving only a "Circular Crust", in the form of a flowchart.

First, the image information input unit 1 inputs image information of a three-dimensional object to be processed (step S11). The image information is described in incidence graph format configured of polygons as nodes, and the sides the polygons as edges (see above description and FIG. 3).

The image information input unit 1 scans the input incidence graph, appropriates identification information $id(N_i)$ to each node $N_i$, obtains the area of corresponding polygons, and registers the identification information, area, and number of polygons (initial value is 1) for each node in the node statistical information (initialization). Initialization processing of the node statistical information is the same as the case described with FIG. 5, so description here will be omitted.

Next, the incidence graph evaluation unit 2 evaluates and sorts the edges of the input incidence graph (step S2). Specifically, the difference in area between image regions connected by edges are appropriated as edge weight values, and sorting is performed in the increasing order of weight values.

Next, the parameter Q for controlling the coarseness of segmentation is set from the parameter setting unit 5 (step S13).

The image region mesh growing unit 3 extracts pairs of image regions sandwiching edges, in the sorted order (step S14). Mesh growing is then performed based on whether or not these image regions satisfy a predicate based on a statistical algorithm (step S15). The predicate used here is derived from the statistical concentration inequality which is a phenomenon occurring in area of polygons serving as an image region (described above), using the parameter Q set in step S13.

Upon image regions being merged, the image region mesh growing unit 3 generates a new node, provides a new id for identifying the new node, calculates the area and the number of polygons of the image region newly generated by merging, and updates the node statistical information (step S16).

A mock program code of merging image regions leaving only a "Circular Crust" and subsequently updating the node statistical information is shown below. Note here that Merge( ) is a function for performing mesh growing of the image regions indicated by arguments, Extract( ) is a function for extracting image regions corresponding to the identification information indicated by arguments, and Create Crust is a function for performing processing for leaving only the "circular Crust" of multiple regions indicated by arguments.

[Expression 10]

$\text{Merge}(N_i, N_j)$ $\text{Extract}(id(N_i)) = R_i$ $\text{Extract}(id(N_j)) = R_j$ $\text{Create Crust}(R_i \cup R_j)$ $\text{Compute area}(\text{Crust}(R_i \cup R_j))$ $\text{Compute } n(\text{Crust}(R_i \cup R_j))$ $id'(N_i) = id'(N_j)$ $\text{area}(id'(N_i)) = \text{area}(\text{Crust}(R_i \cup R_j))$ $n(id'(N_i)) = n(\text{Crust}(R_i \cup R_j))$ $id(N_i) \leftarrow id'(N_i)$ $id(N_1) \leftarrow id'(N_j)$ (10)

First, mesh growing of the nodes $N_i$ and $N_j$ indicated by the arguments of the Merge function is performed. Image regions $R_i$ and $R_j$ corresponding to the nodes $N_i$ and $N_j$ are respectively extracted using the function Extract. Note that the image region $R_i$ is all nodes $N_l$ having the same node identification $id(N_i)$ (i.e., $R_i = \{N_l | id(N_l) = id(N_i)\}$).

Next, the function Create Crust is used to generate a Circle Crust for the sum of sets $R_i \cup R_j$. This processing is realized by applying processing such as morphology or the like to the image region.

The area $\text{area}(\text{Crust}(R_i \cup R_j))$ and the number of polygons making up the region $n(\text{Crust}(R_i \cup R_j))$ are then obtained regarding the obtained image region $\text{Crust}(R_i \cup R_j)$.

Next, the original nodes $N_i$ and $N_j$ are provided with the same new identification information $id'(N_i) = id'(N_j)$, indicating that the image regions have been merged and a new node has been generated. The Union-Find algorithm (described earlier), devised by Robert Endre Tarjan can be used for providing new nodes with identification information.

Next, the $\text{area}(\text{Crust}(R_i \cup R_j))$ obtained above is substituted into the area $\text{area}(id'(N_i))$, and also $n(\text{Crust}(R_i \cup R_j))$ is substituted into the number of polygons of the new node $n(id'(Ni))$. The new identification information $id'(N_i)$ and $id'(N_j)$ is provided to the nodes $N_i$ and $N_j$ respectively, thereby ending updating of the node statistical information.

Upon ending processing for all edges within the incidence graph (step S14), the minute region processing unit 4 processes minute regions remaining as the result of mesh growing of image regions (step S17). For example, minute polygonal meshes remaining between or within large image regions are merged into one of the neighboring image regions, regardless of whether or not the predicate is satisfied, thereby improving the appearance of the processing results. The term minute region as used here is a polygonal mesh having area of less than a few percent of the entire mesh surface, for example.

Figure 10:
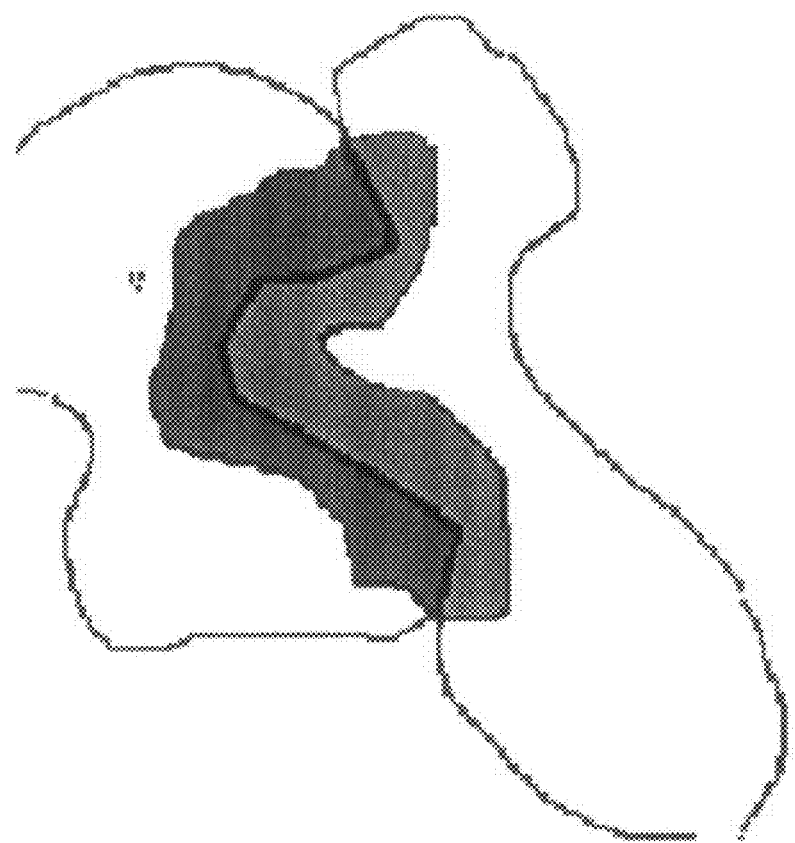
FIG. 10 is a diagram illustrating a state wherein only polygons near a border where image regions, which are to be merged, are in contact i.e., a "Border Crust", is left.

For a "crust", an arrangement may be made wherein the polygons near the boundary where the image regions to be merged come into contact, as shown in FIG. 10 for example, i.e., a "Border Crust" alone is left for subsequent image region mesh growing. Using this Border Crust enables the subsequent determination regarding whether or not to merge image regions to be performed more accurately than with a case of using the Circular Crust. However, in the case of using the Border Crust, not only the node statistical information but also the incidence graph must be updated, and accordingly the amount of calculations is great.

Figure 11:
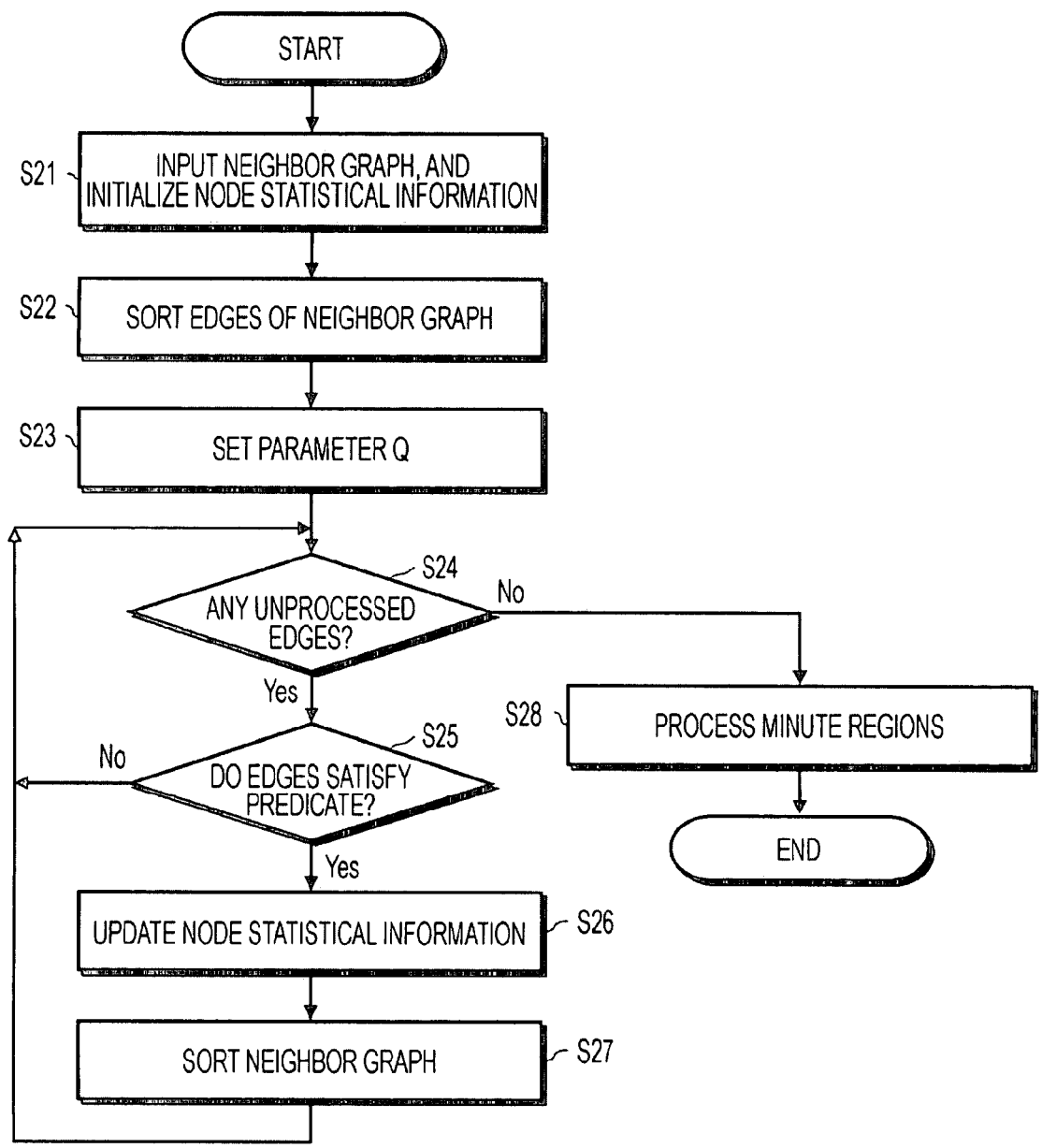
FIG. 11 is a flowchart illustrating processing procedures for performing mesh segmentation processing to leave only a "Border Crust".

FIG. 11 illustrates the processing procedures for performing mesh segmentation leaving only a "Border Crust", in the form of a flowchart.

First, the image information input unit 1 inputs image information of a three-dimensional object to be processed (step S21). The image information is described in incidence graph format configured of polygons as nodes, and the sides the polygons as edges (see above description and FIG. 3).

The image information input unit 1 scans the input incidence graph, appropriates identification information $id(N_i)$ to each node $N_i$, obtains the area of corresponding polygons, and registers the identification information, area, and number of polygons (initial value is 1) for each node in the node statistical information (initialization). Initialization processing of the node statistical information is the same as the case described with FIG. 5, so description here will be omitted.

Next, the incidence graph evaluation unit 2 evaluates and sorts the edges of the input incidence graph (step S22). Specifically, the difference in area between image regions connected by edges are appropriated as edge weight values, and sorting is performed in the increasing order of weight values.

Next, the parameter Q for controlling the coarseness of segmentation is set from the parameter setting unit 5 (step S23).

The image region mesh growing unit 3 extracts pairs of image regions sandwiching edges, in the sorted order (step S24). Mesh growing is then performed based on whether or not these image regions satisfy a predicate based on a statistical algorithm (step S25). The predicate used here is derived from the statistical concentration inequality which is a phenomenon occurring in area of polygons serving as an image region (described above), using the parameter Q set in step S23.

Upon image regions being merged, the image region mesh growing unit 3 generates a new node, provides a new id for identifying the new node, calculates the area and the number of polygons of the image region newly generated by merging, and updates the node statistical information (step S26).

A mock program code of merging image regions leaving only a "Border Crust" and subsequently updating the node statistical information is shown below. Note here that Merge( ) is a function for performing mesh growing of the image regions indicated by arguments, Extract Boundary( ) is a function for extracting boundaries of image regions corresponding to the identification information indicated by arguments, and Create Crust( ) is a function for performing processing for leaving only the "Border Crust" of multiple regions indicated by arguments.

[Expression 11]

Merge($N_i, N_j$)

Extract Bundary($id(N_i), id(N_j)$)=$B_i$

Extract Boundary($id(N_j), id(N_i)$)=$B_j$

Create Crust($R_i \cup R_j$)=$B_i \cup B_j$

Compute area($B_i \cup B_j$)

Compute $n(B_i \cup B_j)$ $id'(N_i) = id'(N_j)$ area($id'(N_i)$)=area($B_i \cup B_j$)

$n(id'(N_i))=n(B_i \cup B_j)$ $id(N_i) \leftarrow id'(N_i)$ $id(N_j) \leftarrow id'(N_j)$ (11)

First, mesh growing of the nodes $N_i$ and $N_j$ indicated by the arguments of the Merge function is performed. A boundary in contact with the image region of the node $N_j$ within the image region $R_i$ of the node $N_i$, and a boundary in contact with the image region of the node $N_i$ within the image region $R_j$ of the node $N_j$, are respectively extracted using the function Extract Boundary.

Figure 12:
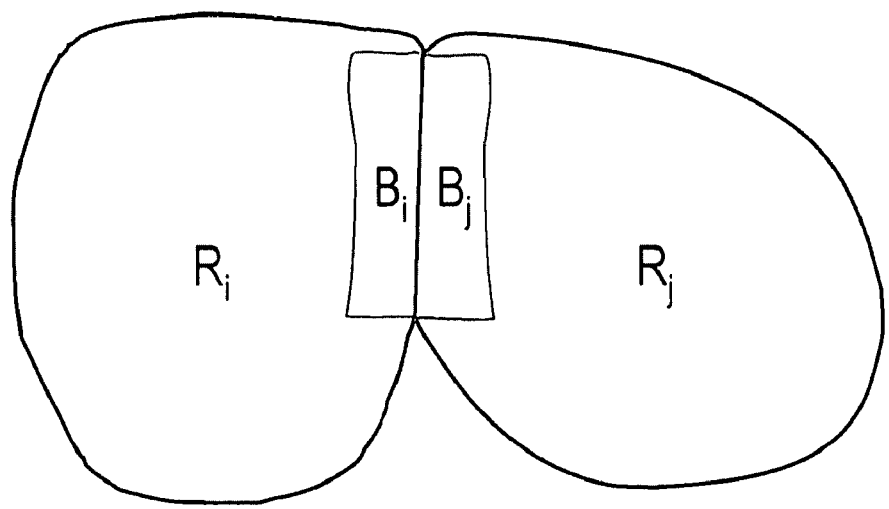
FIG. 12 is a diagram illustrating extracting of a Border Crust from neighbor regions $R_i$ and $R_j$.

Next, the function Create Crust is used to generate a Border Crust for the sum of sets $R_i \cup R_j$. This processing is equivalent to cutting out a region $B_i$ of a certain width (number of pixels) from the boundary portion of the one image region $R_i$ that is in contact with the image region $R_j$, cutting out a region $B_j$ of a certain width (number of pixels) from the boundary portion of the other image region $R_j$ that is in contact with the image region $R_i$, and generating a sum of sets $B_i \cup B_j$ of the cut out image regions (see FIG. 12).

The area area($B_i \cup B_j$) and the number of polygons making up the region $n(B_i \cup B_j)$ are then obtained regarding the obtained image region $B_i \cup B_j$.

Next, the nodes $N_i$ and $N_j$ are provided with the same new identification information $id'(N_i)=id'(N_j)$, indicating that the image regions have been merged and a new node has been generated. The Union-Find algorithm (described earlier), devised by Robert Endre Tarjan can be used for providing new nodes with identification information.

Next, the area ($B_i \cup B_j$) obtained above is substituted into the area area($id'(N_i)$) of the new node. Also, $n(B_i \cup B_j)$ is substituted into the number of polygons of the new node $n(id'(Ni))$. The new identification information $id'(N_i)$ and $id'(N_j)$ is provided to the nodes $N_i$ and $N_j$ respectively, thereby ending updating of the node statistical information.

Next, the image region mesh growing unit 3 performs incidence graph updating processing (Step S27). That is to say, the weighting factors of the edges in the incidence graph are recalculated, and the edges are re-sorted based on the magnitude of the weight values. The flow then returns to step S24, pairs of image regions sandwiching edges are extracted in the sorted order, and merging processing of image regions based on the statistical processing algorithm is repeatedly performed.

First, the identification $id(N_l)$ of the image regions $R_i$ and $R_j$ regarding which a Border Crust is to be generated, and all image regions $R_l$ adjacent thereto, is searched. In the event that there are edges $e_{il}$ and $e_{jl}$ between the nodes $N_l$ corresponding to the found image region and the nodes $N_i$ and $N_j$ to be processed, the weighting thereof is recalculated.

Figure 13:
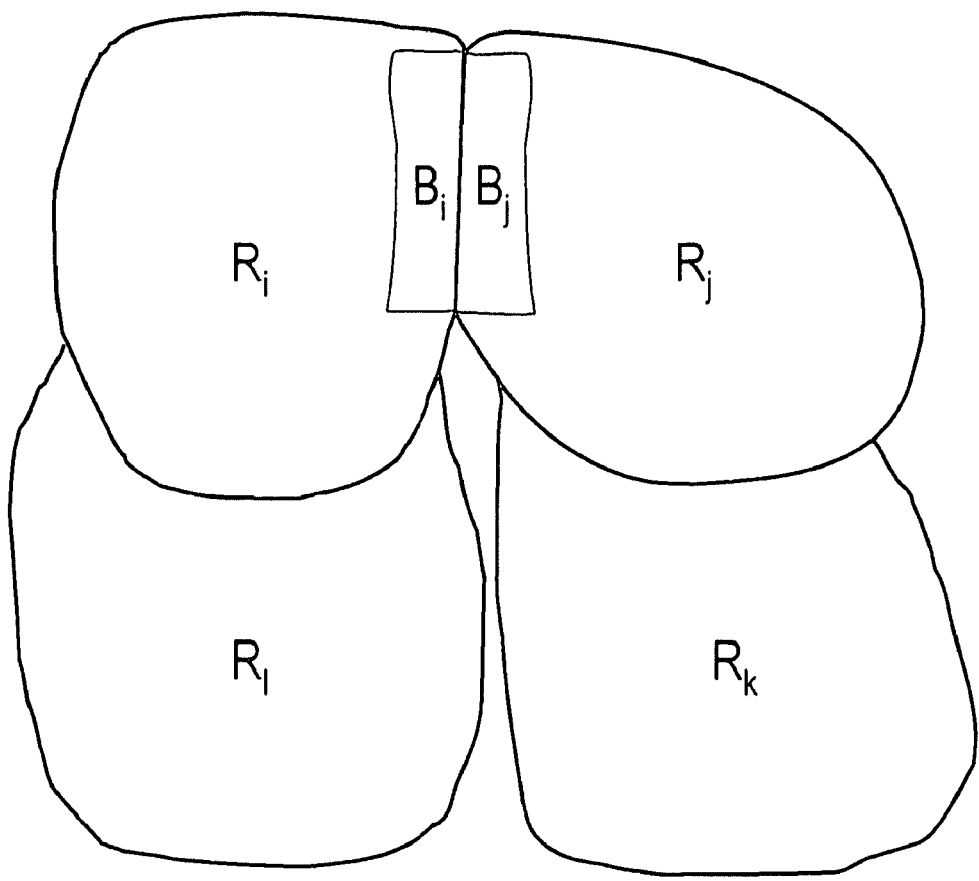
FIG. 13 is a diagram for describing updating of an incidence graph when performing mesh segmentation processing to leave only a "Border Crust".

FIG. 13 illustrates the updating of an incidence graph. In the example in the drawing, we will say that $R_l$ neighboring $R_i$ and $R_k$ neighboring $R_j$ have been discovered as image regions neighboring the image regions $R_i$ and $R_j$ regarding which a Border Crust is to be generated. In this case, the weights $W(e_{il})$ and $W(e_{jk})$ of the respective edges $e_{il}$ and $e_{jk}$ are calculated based on the following expression.

[Expression 12]

$W(e_{i,l}) = |\text{area}(R_i) - \text{area}(R_l)|$ $W(e_{j,k}) = |\text{area}(R_j) - \text{area}(R_k)|$ (12)

Such recursive repetition of image region merging and node statistical information updating processing accompanying the merging eventually reaches a point where there can be found no image region combinations satisfying the predicate wherein the threshold has been set with the parameter Q. That is to say, when there are no more unprocessed edges in the incidence graph (No at step S24), the minute region processing unit 4 processes the remaining minute regions left as a result of the image region mesh growing (step S28). For example, minute polygonal meshes remaining between or within large image regions are merged into one of the neighboring image regions regardless of whether or not the predicate is satisfied, thereby improving the appearance of the processing results. The term minute region as used here is a polygonal mesh having area of less than a few percent of the entire mesh surface, for example.

Note that the predicate (described above) used by the image region mesh processing unit 3 includes the parameter Q for controlling the coarseness of segmentation, so a value of the parameter Q such that a desired coarseness of segmentation can be provided from the parameter setting unit 5. Also, an arrangement may be made such that upon the user providing a desired segmentation coarseness, the parameter setting unit 5 converts this into a corresponding parameter Q value, which is then provided to the system. The user can provide the number of image regions at the time of performing mesh segmentation, and image region mesh growing based on the statistical processing algorithm is fast, so the number of image regions can be changed dynamically, i.e., freely. Such flexible parameter Q setting enables progressive mesh segmentation to be realized, making application to various interactive applications easier.

For example, let us say that Q is set to a certain default value and performing mesh segmentation processing therewith to display the results thereof on a screen yields the original three-dimensional object having been divided into N image regions. In the event that the user responds to the effect that "I want results divided into M regions", the parameter setting unit 5 obtains a Q such that the number of image regions is M, and provides this to the image region mesh growing unit 3, which re-executes the mesh segmentation processing. Of course, an arrangement may be made wherein a conversion reference table is prepared beforehand instead of calculating the conversion processing each time.

With the image processing device 10 according to the present embodiment, continuously inputting multiple Qs from the parameter setting unit 5 enables progressive segmentation to be performed, and hierarchical segmentation to be realized. Image region mesh growing based on the statistical processing algorithm is fast, so the user can change the number of image regions dynamically, i.e., freely, at the time of performing mesh segmentation.

The present inventor considers shape matching as one application of hierarchical segmentation. For example, shape matching can be performed by providing keywords to each segmented image region (for example, see "Modeling by example" (In Proc. SIGGRAPH (2004). Vol. 23, Issue 3, pp. 652-663)).

According to the present invention, keywords are provided to each hierarchical level of the mesh segmentation, so keyword information of the hierarchical structure can be constructed for an image of the original three-dimensional object. In such a case, applying a search, that is shape matching, to the same three-dimensional object yields different search results for each hierarchical level. Alternatively, an arrangement may be made wherein the value of Q is controlled at the parameter setting unit 5 such that desired search results are obtained.

It should be noted that the image region mesh growing based on the statistical processing algorithm is fast, so the number of image regions can be changed dynamically, i.e., freely, when performing mesh segmentation. That is to say, the user can freely change the number of parts immediately in accordance with the search results, simply by performing an operation to reset the Q value via the parameter setting unit 5, whereby similarity control of the search results can be freely operated.

Figure 14:
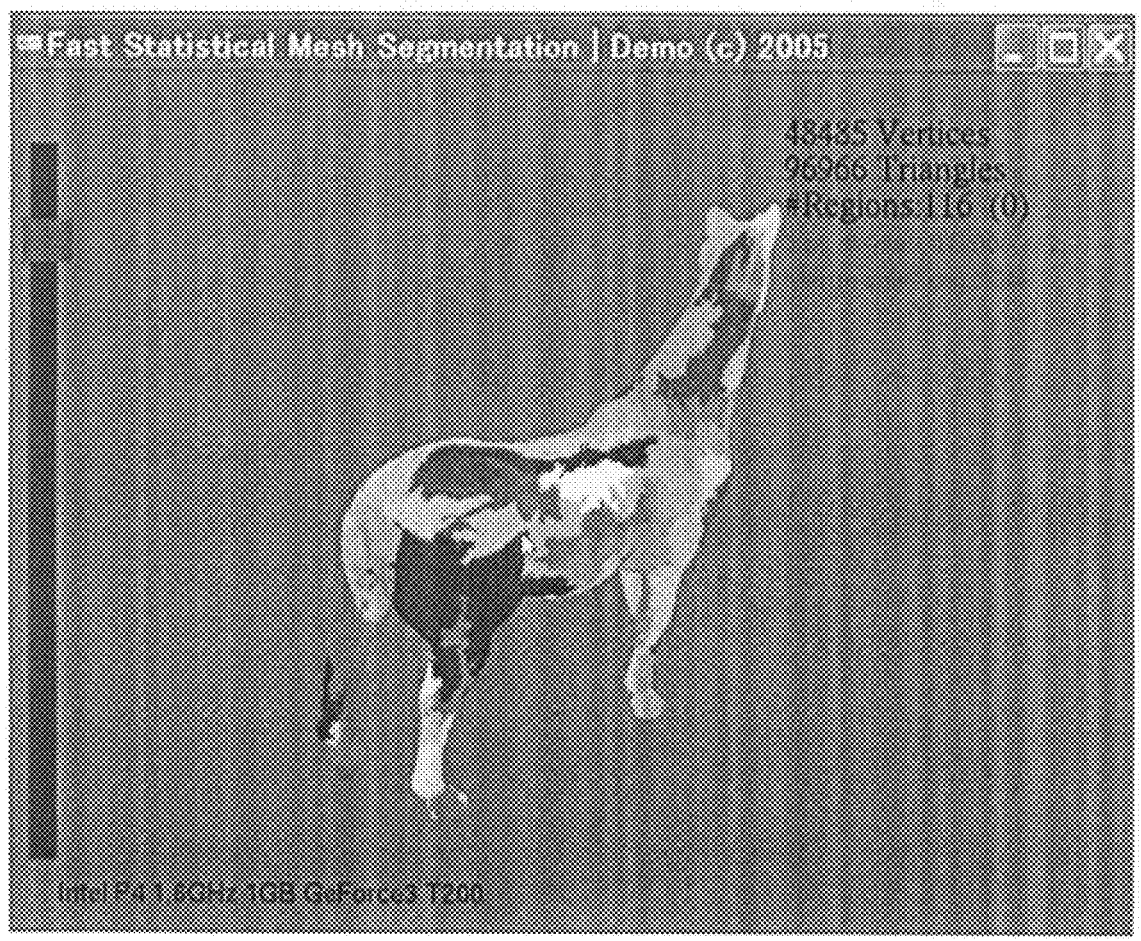
FIG. 14 is a diagram illustrating adjusting of the number of image regions to divide into when performing mesh segmentation, by setting the Q value by operating a slide bar.
Figure 15:
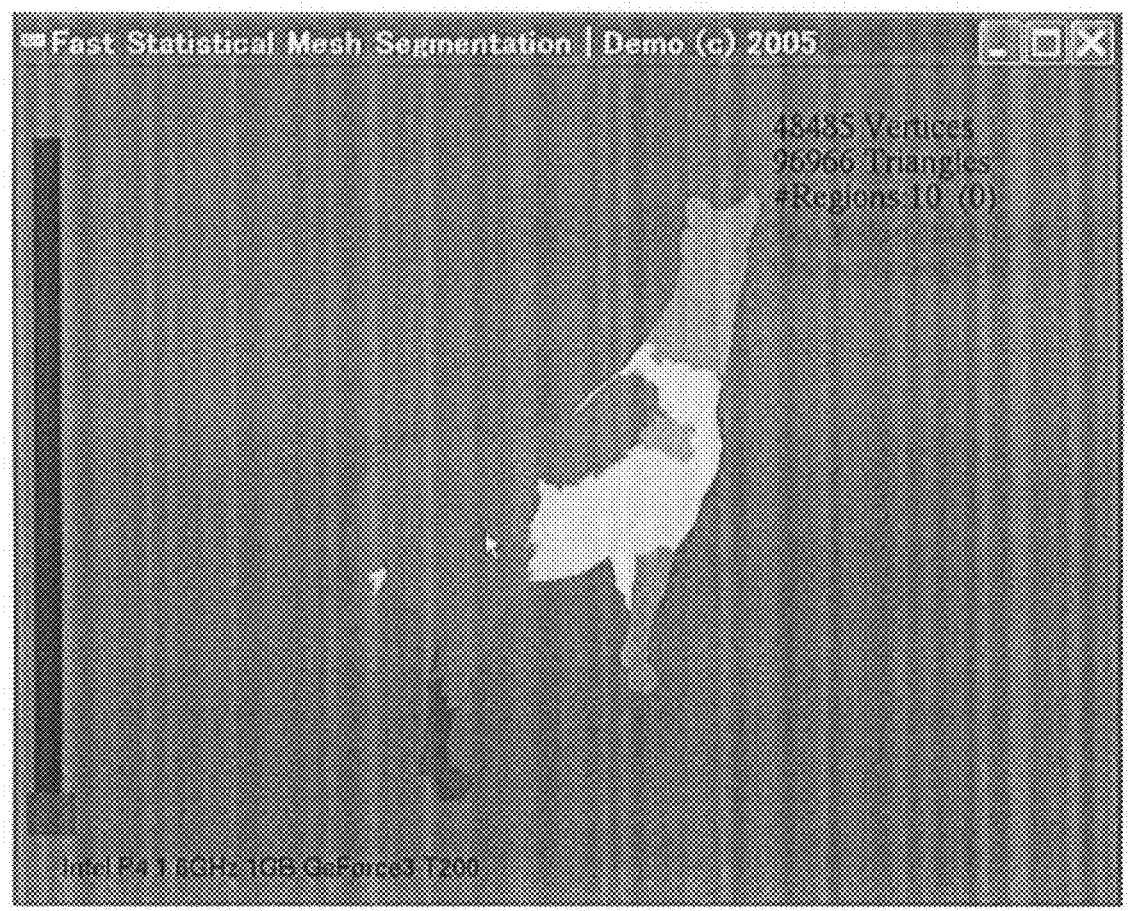
FIG. 15 is a diagram illustrating adjusting of the number of image regions to divide into when performing mesh segmentation, by setting the Q value by operating a slide bar.
Figure 16:
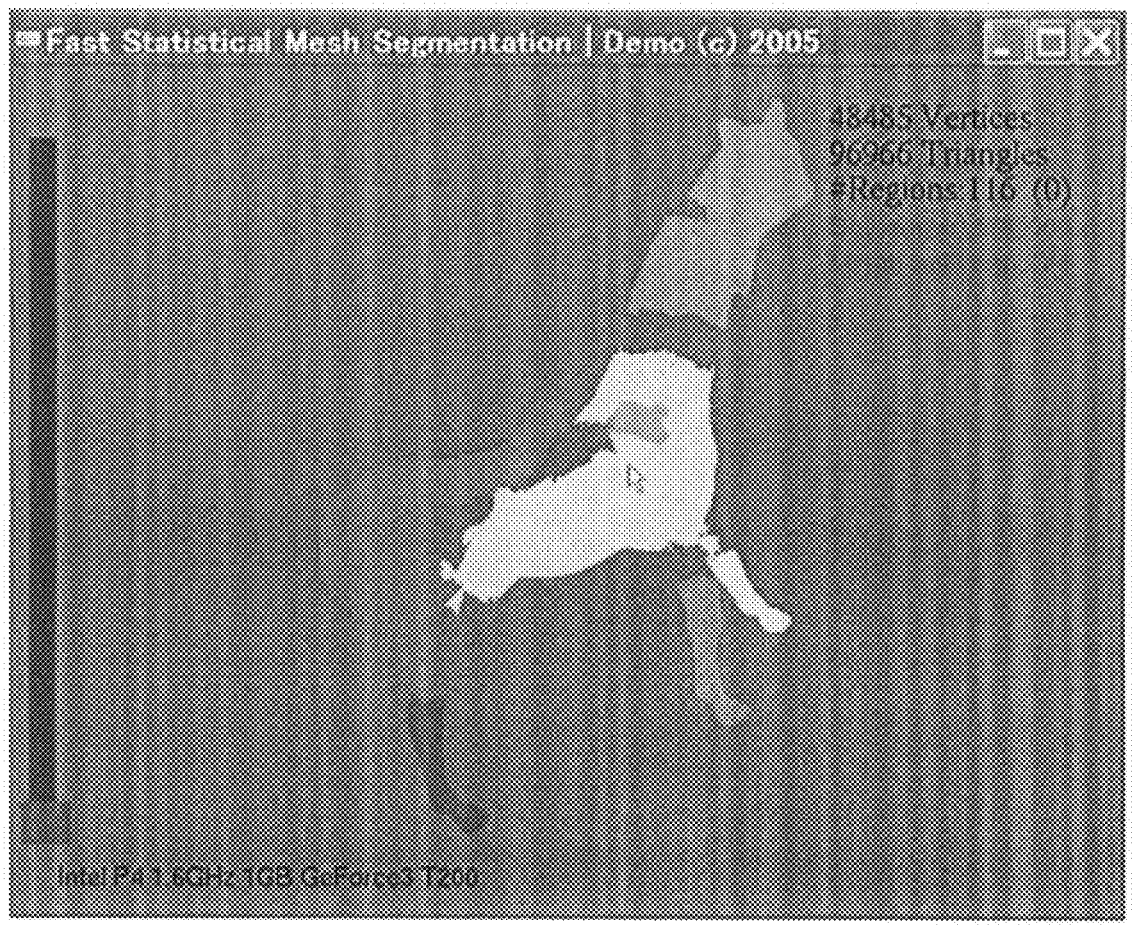
FIG. 16 is a diagram illustrating adjusting of the number of image regions to divide into when performing mesh segmentation, by setting the Q value by operating a slide bar.

This might be carried out in the form of a slide bar being provided on the screen, and the parameter setting unit 5 reading the Q value according to the position to where the user has moved the slider (described above). FIG. 14 through FIG. 16 illustrate the way in which the number of image regions to be divided into is adjusted by setting the Q value by operating the slide bar. As shown in FIG. 14, setting a relatively high Q value with the slide bar shown to the left side suppresses merging of image regions, so the number of image regions is great, i.e., there are many small segments. In this drawing, the number of merged regions is 116, as displayed to the upper right. On the other hand, as shown in FIG. 15 and FIG. 16, setting a relatively high Q value with the slide bar promotes merging of image regions, so the number of image regions is small, i.e., there are many relatively large segments. In these drawings, the number of merged regions is 10, as displayed to the upper right. Image region mesh growth based on the statistical processing algorithm is fast, so the system can quickly obtain mesh segmentation results for a different number of image regions in response to such slide bar operations, and present the results to the user. That is to say, the user can dynamically, i.e., freely, change the number of image regions.

INDUSTRIAL APPLICABILITY

The present invention has been described in detail with reference to specific embodiments. However, it is self-evident that one skilled in the art could make modifications and substitutions to the embodiments without departing from the essence of the invention.

The mesh segmentation processing according to the present invention enables the standard for merging image regions to be freely set, so that polygonal meshes can be generated with a desired coarseness, the system has scalability, and can be applied to various interactive applications such as parameterization and texture mapping, morphing, multi-resolution modeling, image editing, image compression, animation, shape matching, and so forth.

That is to say, the present invention has been disclosed exemplarily, and the descriptions in the present specification should not be interpreted restrictedly. The claims should be referenced to determine the essence of the present invention.

The invention claimed is:

1. An information processing device for handling data in which a topology has been formed of a plurality of nodes each having attribute values, said information processing device comprising:
   a topology evaluation unit for obtaining weighting factors of edges connecting nodes, based on attribute values which neighboring nodes on the topology each have, and sorting edges based on the weighting factors; and
   a node merging processing unit for extracting pairs of nodes connected by edges following the sorted order, evaluating whether or not to merge the nodes based on a predetermined statistical processing algorithm, and performing merging processing of node regions.

2. The information processing device according to claim 1, further comprising a minute node processing unit for processing minute nodes regarding which merging has not been performed sufficiently and which have been left, as the result of merging processing of nodes by said node merging processing unit.

3. The information processing device according to claim 1, wherein said topology evaluating unit appropriates difference in the attribute values which neighboring nodes each have as weighting values to edges, and performs sorting in increasing order of weighting values.

4. The information processing device according to claim 1, wherein said node merging processing unit determines whether or not to merge nodes, based on a predicate derived from the statistical concentration inequality phenomenon in the attribute values which neighboring nodes each have.

5. The information processing device according to claim 1, wherein said node merging processing unit determines that neighboring nodes f(i) and f(j) should be merged in the event that the nodes f(i) and f(j) satisfy a predicate based on the following statistical algorithm regarding statistical information Stats.f(i) and Stats.f(j) held respectively as attribute values (wherein node f(i) includes N(i) nodes and node f(j) includes N(j) nodes, function b(x) represents b(x)=(logx)/Q+(K/x), K is a constant, and Q is a parameter for controlling the coarseness of the segmentations grown by merging nodes)

[Expression 1]

$$\left|\frac{S_k}{n_k} - \frac{S_l}{n_l}\right|^2 \leq \frac{A^2(n_k \log n_k + n_l \log n_l)}{Q}\left(\frac{1}{n_k} + \frac{1}{n_l}\right). \quad (1)$$

6. The information processing device according to claim 1, further comprising a node attribute information holding unit for holding node attribute information relating to each node;
wherein, upon executing node merging, said node merging processing unit calculates attribute information relating to the node newly generated by merging, and performs updating processing of said node statistical information.

7. The information processing device according to claim 6, wherein said topology evaluation unit recalculates the weighting factors of the edges connecting a node subjected to merging processing and a neighboring node thereof, based on updated node attribute information, and re-sorts edges in said topology based on the weighting values;
and wherein said node merging processing unit repeatedly updates node merging and node attribute information updating, until there are no more pairs of image regions to be merged based on said statistical processing algorithm.

8. An information processing method for handling data in which a topology has been formed of a plurality of nodes each having attribute values, said method comprising:
a topology evaluation step for obtaining weighting factors of edges connecting nodes, based on attribute values which neighboring nodes on the topology each have, and sorting edges based on the weighting factors; and
a node merging processing step for extracting pairs of nodes connected by edges following the sorted order, evaluating whether or not to merge the nodes based on a predetermined statistical processing algorithm, and performing merging processing of node regions.

9. The information processing method according to claim 8, further comprising a minute node processing step for processing minute nodes regarding which merging has not been performed sufficiently and which have been left, as the result of merging processing of nodes in said node merging processing step.

10. The information processing method according to claim 8, wherein in said topology evaluating step, difference in the attribute values which neighboring nodes each have is appropriated as weighting values to edges, and sorting is performed in increasing order of weighting values.

11. The information processing method according to claim 8, wherein in said node merging processing step, whether or not to merge nodes is determined, based on a predicate derived from the statistical concentration inequality phenomenon in the attribute values which neighboring nodes each have.

12. The information processing method according to claim 8, wherein determination is made in said node merging processing step that neighboring nodes f(i) and f(j) should be merged in the event that the nodes f(i) and f(j) satisfy a predicate based on the following statistical algorithm regarding statistical information Stats.f(i) and Stats.f(j) held respectively as attribute values (wherein node f(i) includes N(i) nodes and node f(j) includes N(j) nodes, function b(x) represents b(x)=(logx)/Q+(K/x), K is a constant, and Q is a parameter for controlling the coarseness of the segmentations grown by merging nodes)

[Expression 2]

$$|\text{Stats}.f(i) - \text{Stats}.f(j)|^2 \leq b(N[i]) + b(N[j]) \quad (2).$$

13. The information processing method according to claim 8, further comprising a node attribute information holding step for holding node attribute information relating to each node;
wherein, in the event of executing node merging being performed, in said node merging processing step attribute information relating to the node newly generated by merging is calculated, and updating processing of said node statistical information is performed.

14. The information processing method according to claim 13, wherein in said topology evaluation step, the weighting factors of the edges connecting a node subjected to merging processing and a neighboring node thereof are recalculated, based on updated node attribute information, and re-sorts edges in said topology based on the weighting values;
and wherein in said node merging processing step, node merging and node attribute information is repeatedly updated, until there are no more pairs of image regions to be merged based on said statistical processing algorithm.

15. An information processing device for performing image processing, handling an object as a polygonal mesh made up of a plurality of polygons, said information processing device comprising:
an incidence graph input unit for inputting an incidence graph describing a polygonal mesh;
an incidence graph evaluation unit for comparing attribute values which each of image regions connected by edges has and appropriating weighting factors to the edges based on the comparison results, and sorting edges in the incidence graph based on weighting values; and
an image region mesh growing unit for extracting pairs of image regions sandwiching an edge in the sorted order, evaluating whether or not to merge the image regions based on a statistical processing algorithm, and performing mesh growing of the image regions.

16. The information processing device according to claim 15, further comprising a minute region processing unit for processing minute regions left as the result of performing mesh growing of the image regions.

17. The information processing device according to claim 15, wherein said incidence graph input unit handles individual polygons configuring a polygonal mesh as nodes, and inputs an incidence graph described connecting corresponding nodes using edges which are equivalent to the sides of neighboring polygons which are in contact.

18. The information processing device according to claim 15, wherein said incidence graph evaluation unit appropriates difference in the attribute values which the image regions connected by edges in the incidence graph each have as weighting values, and performs sorting in increasing order of weighting values.

19. The information processing device according to claim 18, wherein said incidence graph evaluation unit uses, as attribute information which image regions have, area (average area of a polygonal mesh included in an image region), normal direction, or color (average color of at least one component of RGB within the image region) or other pixel attribute information, of image regions.

20. The information processing device according to claim 15, wherein said image region mesh growing unit determines whether or not to merge image regions connected by edges in an incidence graph, based on a predicate derived from the statistical concentration inequality phenomenon in the area of polygons configuring an image region.

21. The information processing device according to claim 15, wherein said image region mesh growing unit determines the two image regions $R_k$ and $R_l$ connected by edges in an incidence graph are to be merged when satisfying the following predicate based on statistical algorithm (wherein the image region $R_k$ has area $S_k$ and is configured of $n_k$ polygons, and the image region $R_l$ has area $S_l$ and is configured of $n_l$ polygons, A is the largest area of the polygons, and Q is a parameter for controlling the coarseness of segmentation)

[Expression 3]

$$W(e)=|\text{area}(T_1)-\text{area}(T_2)| \qquad (3).$$

22. The information processing device according to claim 21, further comprising parameter setting means for setting the parameter Q in said predicate.

23. The information processing device according to claim 22, further comprising segmentation coarseness control means for providing said parameter setting means with a parameter Q value such that a desired segmentation coarseness can be obtained.

24. The information processing device according to claim 23, wherein, upon being externally provided with a desired segmentation coarseness, said segmentation coarseness control means convert this into a parameter Q value equivalent to the coarseness, and provide this to said parameter setting means.

25. The information processing device according to claim 15, further comprising a node statistical information holding unit for holding node statistical information relating to the area of the image region corresponding to each node of the incidence graph and the number of polygons thereof;
wherein, upon executing merging of image regions, said image region mesh growing processing unit calculates the area of the image region newly generated by merging and the number of polygons, and performs updating processing of said node statistical information.

26. The information processing device according to claim 25, wherein said incidence graph evaluation unit recalculates the weighting factors of the edges connecting an image region subjected to merging processing and a neighboring image region thereof, based on updated node attribute information, and re-sorts edges in said incidence graph based on the weighting values;
and wherein said image region mesh growing processing unit repeatedly performs image region merging and node attribute information updating, until there are no more pairs of image regions to be merged based on said statistical processing algorithm.

27. The information processing device according to claim 25, wherein upon executing merging of image regions, said image region mesh growing processing unit calculates the area of the image region and the number of polygons and performs updating processing of said node statistical unit, leaving only a crust made up of polygons near the boundary of the newly-generated image region, and uses the crust for subsequent determination regarding whether or not to merge image regions.

28. The information processing device according to claim 27, wherein said image region mesh growing processing unit leaves, as a crust, the polygons near the boundary over the entire circumference of the image region newly generated by merging.

29. The information processing device according to claim 27, wherein said image region mesh growing processing unit leaves, as a crust, the polygons near the boundary where the image regions to be merged are in contact;
and upon performing mesh growing, said incidence graph evaluation unit re-evaluates the incidence graph.

30. An information processing method for performing image processing, handling an object as a polygonal mesh made up of a plurality of polygons, said method comprising:
an incidence graph input step for inputting an incidence graph describing a polygonal mesh;
an incidence graph evaluation step for comparing attribute values which each of image regions connected by edges has and appropriating weighting factors to the edges based on the comparison results, and sorting edges in the incidence graph based on weighting values; and
an image region mesh growing step for extracting pairs of image regions sandwiching an edge in the sorted order, evaluating whether or not to merge the image regions based on a statistical processing algorithm, and performing mesh growing of the image regions.

31. The information processing method according to claim 30, further comprising a minute region processing step for processing minute regions left as the result of performing mesh growing of the image regions.

32. The information processing method according to claim 30, wherein in said incidence graph input step, individual polygons configuring a polygonal mesh are handled as nodes, and an incidence graph, described connecting corresponding nodes using edges which are equivalent to the sides of neighboring polygons which are in contact, is input.

33. The information processing method according to claim 30, wherein in said incidence graph evaluation step, difference in the attribute values which the image regions connected by edges in the incidence graph each have are appropriated as weighting values, and sorting in increasing order of weighting values is performed.

34. The information processing method according to claim 33, wherein in said incidence graph evaluation step, area, normal direction, or color or other pixel attribute information, of image regions, are used as attribute information which image regions have.

35. The information processing method according to claim 30, wherein in said image region mesh growing step, whether or not to merge image regions connected by edges in an incidence graph is determined, based on a predicate derived from the statistical concentration inequality phenomenon in the area of polygons configuring an image region.

36. The information processing method according to claim 30, wherein determination is made in said image region mesh growing step that the two image regions $R_k$ and $R_l$ connected by edges in an incidence graph are to be merged when satisfying the following predicate based on statistical algorithm (wherein the image region $R_k$ has area $S_k$ and is configured of $n_k$ polygons, and the image region $R_l$ has area $S_l$ and is configured of $n_l$ polygons, A is the largest area of the polygons, and Q is a parameter for controlling the coarseness of segmentation)

[Expression 4]

$$w(E=(V_{i,j}, V_{i',j'}))=\max_{C\in\{R,G,B\}}(|I_C(i,j)-I_C(i',j')|) \qquad (4).$$

37. The information processing method according to claim 36, further comprising a parameter setting step for setting the parameter Q in said predicate.

38. The information processing method according to claim 37, further comprising a segmentation coarseness control step for providing said parameter setting means with a parameter Q value such that a desired segmentation coarseness can be obtained.

39. The information processing method according to claim 38, wherein, upon being externally provided with a desired segmentation coarseness, this is converted into a parameter Q value equivalent to the coarseness, and provided to said parameter setting means, in said segmentation coarseness control step.

40. The information processing method according to claim 30, further comprising a node statistical information holding step for holding node statistical information relating to the area of the image region corresponding to each node of the incidence graph and the number of polygons thereof;
   wherein, upon executing merging of image regions, in said image region mesh growing processing step the area of the image region newly generated by merging and the number of polygons are calculated, and updating processing of said node statistical information is performed.

41. The information processing method according to claim 40, further comprising an incidence graph re-evaluation step for recalculating the weighting factors of the edges connecting an image region subjected to merging processing and a neighboring image region thereof, based on updated node attribute information, and re-sorting edges in said incidence graph based on the weighting values;
   wherein, in said image region mesh growing processing step, image region merging and node attribute information updating is repeatedly performed, until there are no more pairs of image regions to be merged based on said statistical processing algorithm.

42. The information processing method according to claim 40, wherein upon executing merging of image regions, in said image region mesh growing processing step the area of the image region and the number of polygons is calculated and updating processing of said node statistical information is performed, leaving only a crust made up of polygons near the boundary of the newly-generated image region, and the crust is used for subsequent determination regarding whether or not to merge image regions.

43. The information processing method according to claim 42, wherein in said image region mesh growing processing step, the polygons near the boundary over the entire circumference of the image region newly generated by merging are left as a crust.

44. The information processing method according to claim 42, wherein, in said image region mesh growing processing step, the polygons near the boundary where the image regions to be merged are in contact is left as a crust;
   and upon performing mesh growing, the incidence graph is re-evaluated in said incidence graph evaluation step.

45. A non-transitory computer readable medium storing a program to execute, on a computer, processing for handling data in which a topology has been formed of a plurality of nodes each having attribute values, said program causing said computer to execute:
   a topology evaluation step for obtaining weighting factors of edges connecting nodes, based on attribute values which neighboring nodes on the topology each have, and sorting edges based on the weighting factors; and
   a node merging processing step for extracting pairs of nodes connected by edges following the sorted order, evaluating whether or not to merge the nodes based on a predetermined statistical processing algorithm, and performing merging processing of node regions.

46. A non-transitory computer readable medium storing a program to execute, on a computer, processing for handling an object as a polygonal mesh made up of a plurality of polygons, said program causing said computer to execute:
   an incidence graph input step for inputting an incidence graph describing a polygonal mesh;
   an incidence graph evaluation step for comparing attribute values which each of image regions connected by edges has and appropriating weighting factors to the edges based on the comparison results, and sorting edges in the incidence graph based on weighting values; and
   an image region mesh growing step for extracting pairs of image regions sandwiching an edge in the sorted order, evaluating whether or not to merge the image regions based on a statistical processing algorithm, and performing mesh growing of the image regions.

* * * * *